US012708583B2

(12) United States Patent
Dearnley-Davison et al.

(10) Patent No.: US 12,708,583 B2
(45) Date of Patent: Aug. 18, 2026

(54) SURGICAL TABLE EXTENSION FOR USE WITH A SURGICAL TABLE

(71) Applicant: Care Surgical Limited, Burscough (GB)

(72) Inventors: Christopher Dearnley-Davison, Hudson, MA (US); Sam Banfield, Burscough (GB); Saul Berman, Burscough (GB); Joe Hignett, Burscough (GB); David Hulson, Burscough (GB)

(73) Assignee: Care Surgical Limited, Burscough (GB)

( * ) Notice: Subject to any disclaimer, the term of this patent is extended or adjusted under 35 U.S.C. 154(b) by 0 days.

(21) Appl. No.: 18/918,412

(22) Filed: Oct. 17, 2024

(65) Prior Publication Data

US 2025/0120867 A1 Apr. 17, 2025

Related U.S. Application Data

(60) Provisional application No. 63/544,480, filed on Oct. 17, 2023.

(51) Int. Cl.

*A61G 13/12* (2006.01)
*A61G 3/02* (2006.01)

(Continued)

(52) U.S. Cl.

CPC ............ *A61G 13/129* (2013.01); *A61G 3/02* (2013.01); *A61G 13/06* (2013.01); *A61G 13/104* (2013.01)

(58) Field of Classification Search

CPC ........ A61G 13/129; A61G 3/02; A61G 13/06; A61G 13/104; A61G 13/101

See application file for complete search history.

(56) References Cited

U.S. PATENT DOCUMENTS 2,609,261 A * 9/1952 Parker .................... A61G 13/12 312/309
4,054,282 A * 10/1977 Hamer ............... A61G 13/0045 5/610

(Continued)

FOREIGN PATENT DOCUMENTS

JP 2019072092 A 5/2019
JP 2021137110 A 9/2021

OTHER PUBLICATIONS

International Search Report dated Mar. 5, 2025 received in PCT/US2024/051704.

(Continued)

*Primary Examiner* — Aaron R Eastman

(74) *Attorney, Agent, or Firm* — Scully, Scott, Murphy & Presser, P.C.

(57) ABSTRACT

A surgical table extension for use with a surgical table. The surgical table extension including: a leg including a base. The base having a plurality of casters; first and second rails extending from the leg; a hinge disposed on the leg, the hinge is configured to permit movement of the first and second rails about at least a first axis relative to the leg; and a clamp configured to at least indirectly clamp the first and second rails to the surgical table. Wherein the leg is linearly movable relative to the base to permit passive movement of the leg relative to the surgical table when the first and second rails are inclined relative to the base.

24 Claims, 24 Drawing Sheets

(51) Int. Cl.
*A61G 13/06* (2006.01)
*A61G 13/10* (2006.01)

(56) References Cited

U.S. PATENT DOCUMENTS 4,995,067 A * 2/1991 Royster .................. A61G 13/10 5/601
2002/0170115 A1* 11/2002 Borders ............... A61G 13/101 5/624
2006/0096033 A1* 5/2006 Wong ..................... A61G 13/10 5/721
2006/0242765 A1* 11/2006 Skripps .................. A61G 13/04 5/624
2006/0248650 A1* 11/2006 Skripps .............. A61G 13/0054 5/624
2006/0253985 A1* 11/2006 Skripps ................ A61G 13/129 5/622
2010/0242181 A1* 9/2010 Bochner .............. A61G 13/129 5/648
2014/0068866 A1* 3/2014 Catacchio .............. A61G 7/075 5/630
2016/0281920 A1* 9/2016 Perez ................... F16M 13/022
2016/0287461 A1* 10/2016 Naughton .............. A61G 13/08
2020/0108850 A1 4/2020 Klem et al.
2020/0121536 A1* 4/2020 Senska ................. A61G 13/129
2021/0251837 A1 8/2021 Siccardi et al.
2024/0261169 A1* 8/2024 Tamm .................. A61G 13/101

OTHER PUBLICATIONS

Written Opinion of the International Searching Authority dated Mar. 5, 2025 received in PCT/US2024/051704.

* cited by examiner 138
112
101
162
156
A3
108
110
102c
102b
114
10A
106
106
102
102a

SURGICAL TABLE EXTENSION FOR USE WITH A SURGICAL TABLE

CROSS-REFERENCE TO RELATED APPLICATION

The present application is based upon and claims the benefit of priority from U.S. Provisional Application No. 63/544,480, filed on Oct. 17, 2023, the entire contents of which is incorporated herein by reference.

BACKGROUND

Field

The present disclosure relates to a surgical equipment, in particular a surgical table extension for use with a surgical table.

Prior Art

Conventional surgical table extensions are known that clamp onto standard surgical table rails provided on the surgical table. Such conventional surgical table extensions are useful for supporting a patient in varying postures and for holding various surgical equipment used on the patient during a surgical procedure.

However, such conventional surgical extensions are not easily clamped to the surgical table and adjusting the position of the surgical table extension relative to the surgical table as the position of the surgical table extension relative to the surgical table is varied is cumbersome and leads to inefficiencies in the surgical procedure and in the efforts of the surgical personnel during the procedure.

SUMMARY

Accordingly, a surgical table extension for use with a surgical table is provided. The surgical table extension comprising: a leg comprising a base, the base having a plurality of casters; first and second rails extending from the leg; a hinge disposed on the leg, the hinge is configured to permit movement of the first and second rails about at least a first axis relative to the leg; and a clamp configured to at least indirectly clamp the first and second rails to the surgical table. Wherein the leg is linearly movable relative to the base to permit passive movement of the leg relative to the surgical table when the first and second rails are inclined relative to the base.

The leg can be connected to the base by one or more linear bearings. The one or more linear bearings can be configured to move the leg relative to the base in a direction towards the surgical table.

The leg can comprise a plurality of telescoping leg portions, an upper leg portion of the plurality of leg portions can be fitted within an adjacent lower leg portion of the plurality of leg portions; and the telescopic leg can further comprise an actuator for moving the plurality of telescoping leg portions relative to each other to increase or decrease a height of the leg relative to the base.

The hinge can be configured to permit movement of the first and second rails about at least the first axis and a second axis relative to the leg.

The base can further comprise a plurality of casters for rolling the base, at least one of the plurality of casters can have a lock to prevent movement of the base.

Also provided is a surgical table extension for use with a surgical table, where the surgical table extension comprising: a leg comprising a base; first and second rails extending from the leg; a hinge disposed on the leg, the hinge is configured to permit movement of the first and second rails about at least a first axis relative to the leg; a cross-bar connecting ends of the first and second rails; and first and second clamps configured to clamp the frame members to the surgical table, the first and second clamps disposed at respective ends of the cross-bar. Each of the first and second clamps comprising: an extension bar slidably disposed relative to the cross-bar for moving the first and second clamps in a direction orthogonal to an extending direction of the first and second rails to accommodate a width of the surgical table; a first lock for independently locking the extension bar relative to the cross-bar; and a second lock for independently locking the respective first and second clamp to the surgical table.

The first lock can comprise a clamp body; a locking lever rotatable relative to an outer surface of the clamp body; a pawl movable relative to an outer surface of the cross-bar between an unlocked position where a surface of the pawl is withdrawn from the outer surface of the cross-bar and a locked position where the surface of the pawl is extended to engage outer surface of the cross-bar; and an intermediary link having a first end engaged with the locking lever and a second end engaged with the pawl such that the intermediary link urges the pawl into the locked position when the locking lever is rotated in a first direction relative to the clamp body and the pawl is urged into the unlocked position when the locking lever is rotated in a second direction, opposite to the first direction.

The surgical table extension can further comprise third and fourth clamps disposed on respective ends of the first and second rails for clamping the respective ends of the first and second rails to the cross-bar. The third and fourth clamps can each be rotatable about a center axis of the cross-bar. Each of the third and fourth clamps can comprise a third lock for independently locking each of the third and fourth clamps to the cross-bar while permitting rotation about the center axis of the cross-bar. The third lock can comprise: a clamp body having a slot for acceptance of the cross-bar; a locking lever rotatable relative to an outer surface of the clamp body; a pawl movable relative to the slot between an unlocked position where a surface of the pawl is withdrawn from the slot and a locked position where the surface of the pawl is extended into the slot to engage the cross-bar; and an intermediary link having a first end engaged with the locking lever and a second end engaged with the pawl such that the intermediary link urges the pawl into the locked position when the locking lever is rotated in a first direction relative to the clamp body and the pawl is urged into the unlocked position when the locking lever is rotated in a second direction, opposite to the first direction. The cross-bar can further comprise first and second collars, each third lock being disposed between each first lock and a respective one of the first and second collars to prevent movement of the third lock in a center axis direction of the cross-bar.

Still further provided is a surgical table extension for use with a surgical table, where the surgical table extension comprising: a leg comprising a base; first and second rails extending from the leg; a hinge disposed on the leg, the hinge is configured to permit movement of the first and second rails about at least a first axis relative to the leg; a cross-bar connecting ends of the first and second rails; and first and second clamps configured to clamp the cross-bar to the surgical table, the first and second clamps disposed at respective ends of the cross-bar; and third and fourth clamps disposed on respective ends of the first and second rails for clamping the respective ends of the first and second rails to the cross-bar.

The third and fourth clamps can each be rotatable about a center axis of the cross-bar.

Each of the third and fourth clamps can comprise a first lock for independently locking each of the third and fourth clamps to the cross-bar while permitting rotation about the center axis of the cross-bar. The first lock can comprise: a clamp body having a slot for acceptance of the cross-bar; a locking lever rotatable relative to an outer surface of the clamp body; a pawl movable relative to the slot between an unlocked position where a surface of the pawl is withdrawn from the slot and a locked position where the surface of the pawl is extended into the slot to engage the cross-bar; and an intermediary link having a first end engaged with the locking lever and a second end engaged with the pawl such that the intermediary link urges the pawl into the locked position when the locking lever is rotated in a first direction relative to the clamp body and the pawl is urged into the unlocked position when the locking lever is rotated in a second direction, opposite to the first direction.

The surgical table extension can further comprise an extension bar slidably disposed relative to the cross-bar for moving the first and second clamps in a direction orthogonal to an extending direction of the first and second rails to accommodate a width of the surgical table; and a second lock for locking the extension bar relative to the cross-bar.

The cross-bar can further comprise first and second collars, each first lock being disposed between each second lock and a respective one of the first and second collars to prevent movement of the first lock in a center axis direction of the cross-bar.

Still yet further provided is a surgical table extension for use with a surgical table, where the surgical table extension comprising: a leg comprising a base, the base having a plurality of casters; first and second rails extending from the leg, the first and second rails being connected and spaced apart by a base-side cross-bar; a hinge disposed on the leg, the hinge is configured to permit movement of the first and second rails about first and second axes relative to the leg; and a first clamp configured to at least indirectly clamp the first and second rails to the surgical table. Wherein the hinge comprises: a shaft rotatably captured at an end of the leg such that the shaft rotates about the second axis; a second clamp disposed at an end of the shaft, the second clamp having a slot for acceptance of the base-side cross-bar such that the base-side cross-bar rotates about the first axis relative to the slot; and a locking mechanism for locking the base-side cross-bar in the slot while permitting rotation of the base-side cross-bar about the first axis.

At least a central portion of the base-side cross-bar can have a circular cross-section disposed in the slot. The base side cross-bar can comprise first and second end portions having non-circular cross-sections and a central coupling connecting the first and second end portions, the central coupling having the circular cross section.

The shaft can comprise a locking knob for locking the shaft and the base-side cross-bar in a first axis rotation position.

The locking mechanism can comprise a pawl and a spring member for biasing a first end of the pawl into the slot and locking the base-side cross-bar in the slot, the pawl having a second end, which when pressed rotates the first end of the pawl from the slot against a biasing force of the spring member to permit entry or removal of the base-side cross-bar into and from the slot.

BRIEF DESCRIPTION OF DRAWINGS

Further characteristics will become apparent from the description of the embodiments together with the claims and the included drawings. Embodiments can fulfill individual characteristics or a combination of several characteristics.

The embodiments are described below, without restricting the general intent of the invention, based on the exemplary embodiments, wherein reference is made expressly to the drawings with regard to the disclosure of all details that are not explained in greater detail in the text. In the drawings.

DETAILED DESCRIPTION

Figure 1:
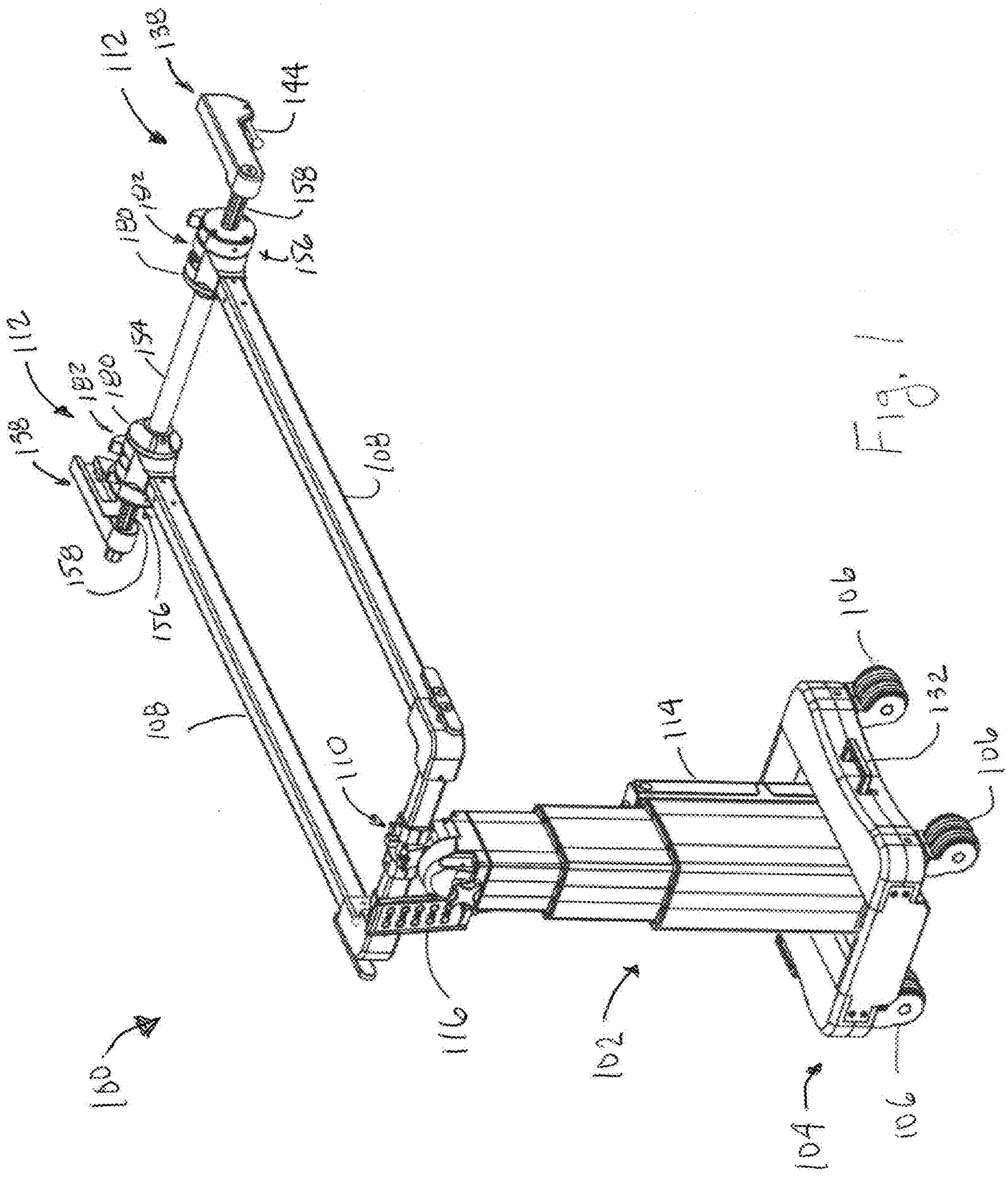
FIG. 1 illustrates a perspective view of a surgical table extension for use with a surgical table.
Figure 2:
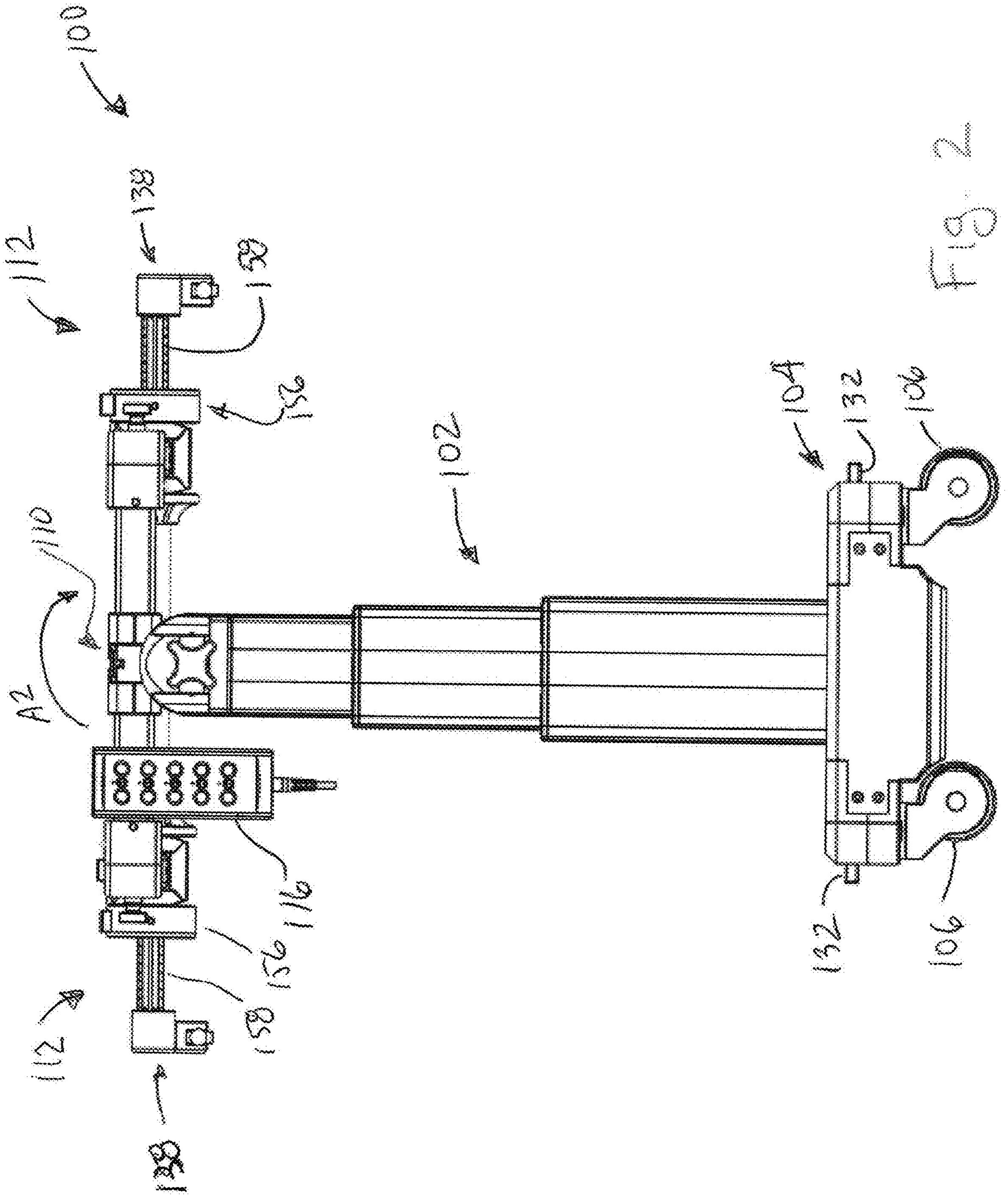
FIG. 2 illustrates a rear view of the surgical table extension of FIG. 1.
Figure 3:
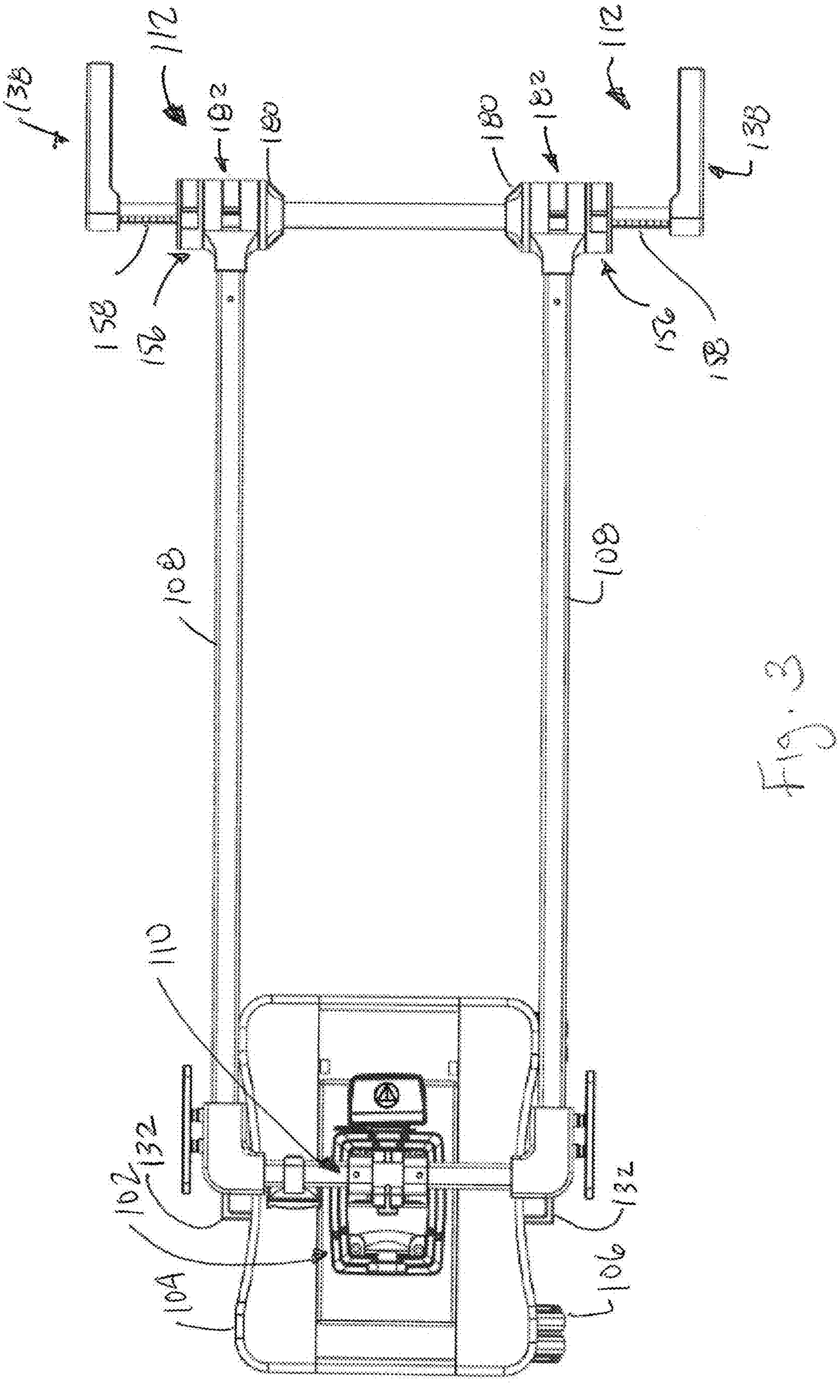
FIG. 3 illustrates a top view of the surgical table extension of FIG. 1.
Figure 4:
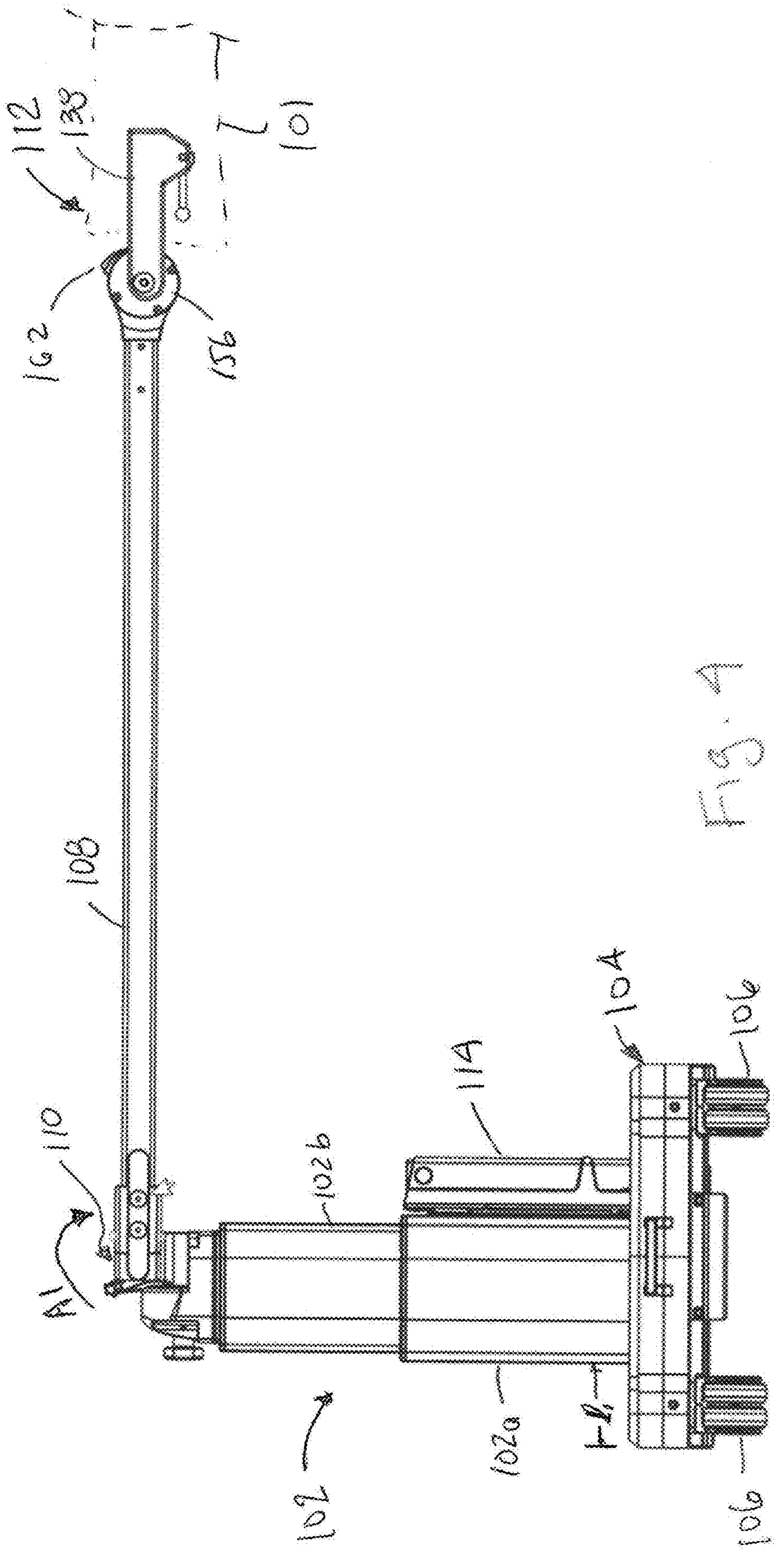
FIG. 4 illustrates a side view of the surgical table extension of FIG. 1 where the rails are substantially parallel to a floor surface.

Referring now to FIG. 1, there is illustrated a perspective view of a surgical table extension for use with a surgical table, the surgical table extension being generally referred to by reference numeral 100. FIGS. 2-4 illustrate a rear, top and side view, respectively, of the surgical table extension 100.

The surgical table extension 100 generally comprises a leg 102 having a base 104. The base 104 has a plurality of casters 106 that can switch between a state in which the surgical extension table 100 can freely move between positions and a state in which the surgical table extension 100 is locked in a position. The surgical table extension 100 illustrated in FIGS. 1-4 has four casters 106, each positioned at a respective corner of the base 104. More of less casters 106 can be employed as long as the base is stably supported.

The surgical table extension 100 further generally comprises first and second rails 108 extending from the leg 102. The first and second rails 108 can be tubular and rectangular in cross-section, however, other cross-sectional shapes can also be used. Although the first and second rails 108 can be formed of many materials, in the preset embodiment, they are formed of radiolucent carbon fiber. The first and second rails 108 are spaced at a set distance from each other so as engage with various surgical table configurations and accessories. A hinge 110 is disposed on the leg and configured to permit movement of the first and second rails 108 about at least a first axis A1 relative to the leg 102. The hinge 110 can also permit movement of the first and second rails about first A1 and second axes A2.

The surgical table extension 100 further generally comprises a clamp assembly 112 configured to at least indirectly clamp the first and second rails 108 to the surgical table.

Figure 5:
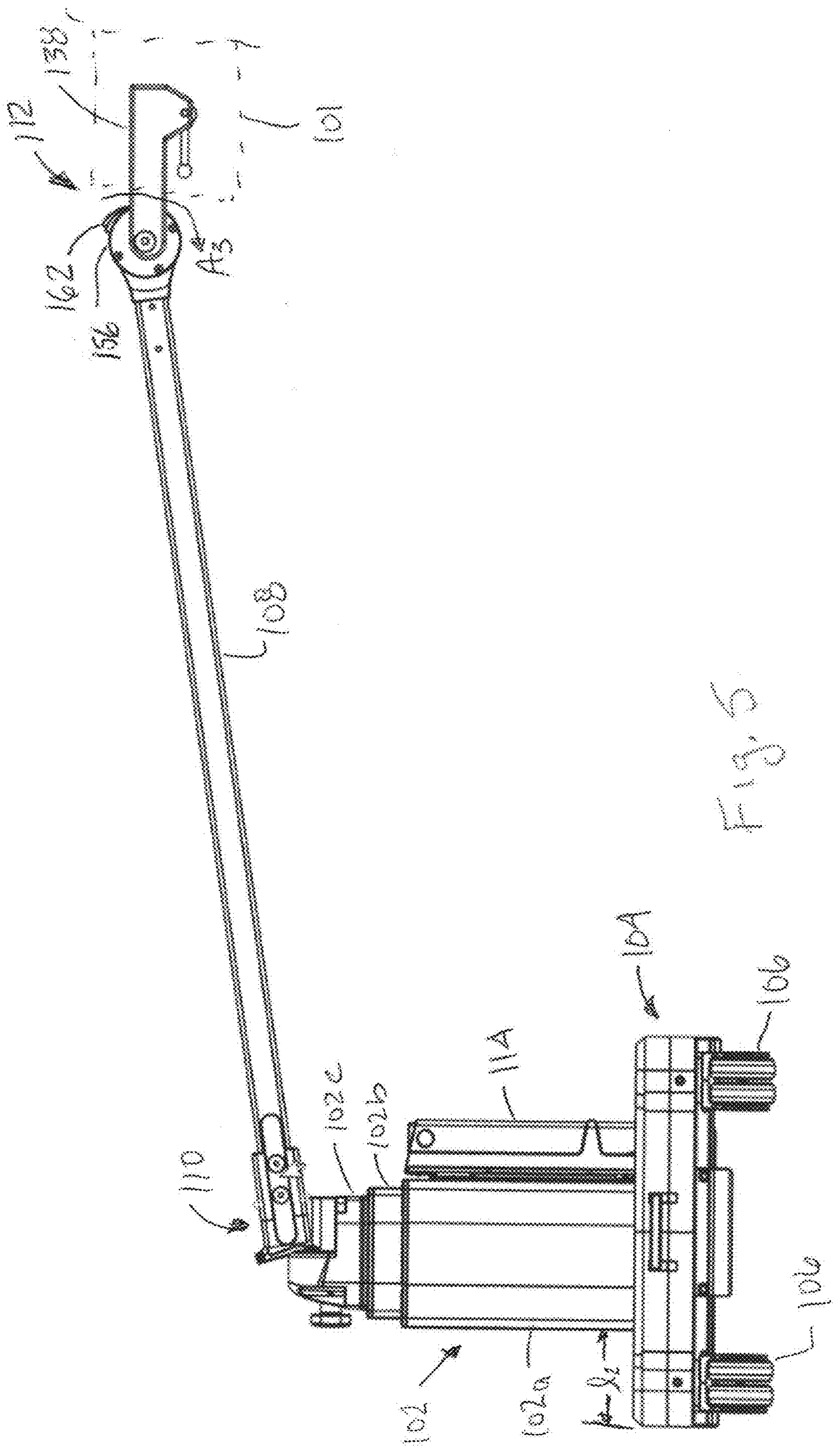
FIG. 5 illustrates the side view of the surgical table extension of FIG. 4 where the leg is lowered.
Figure 6:
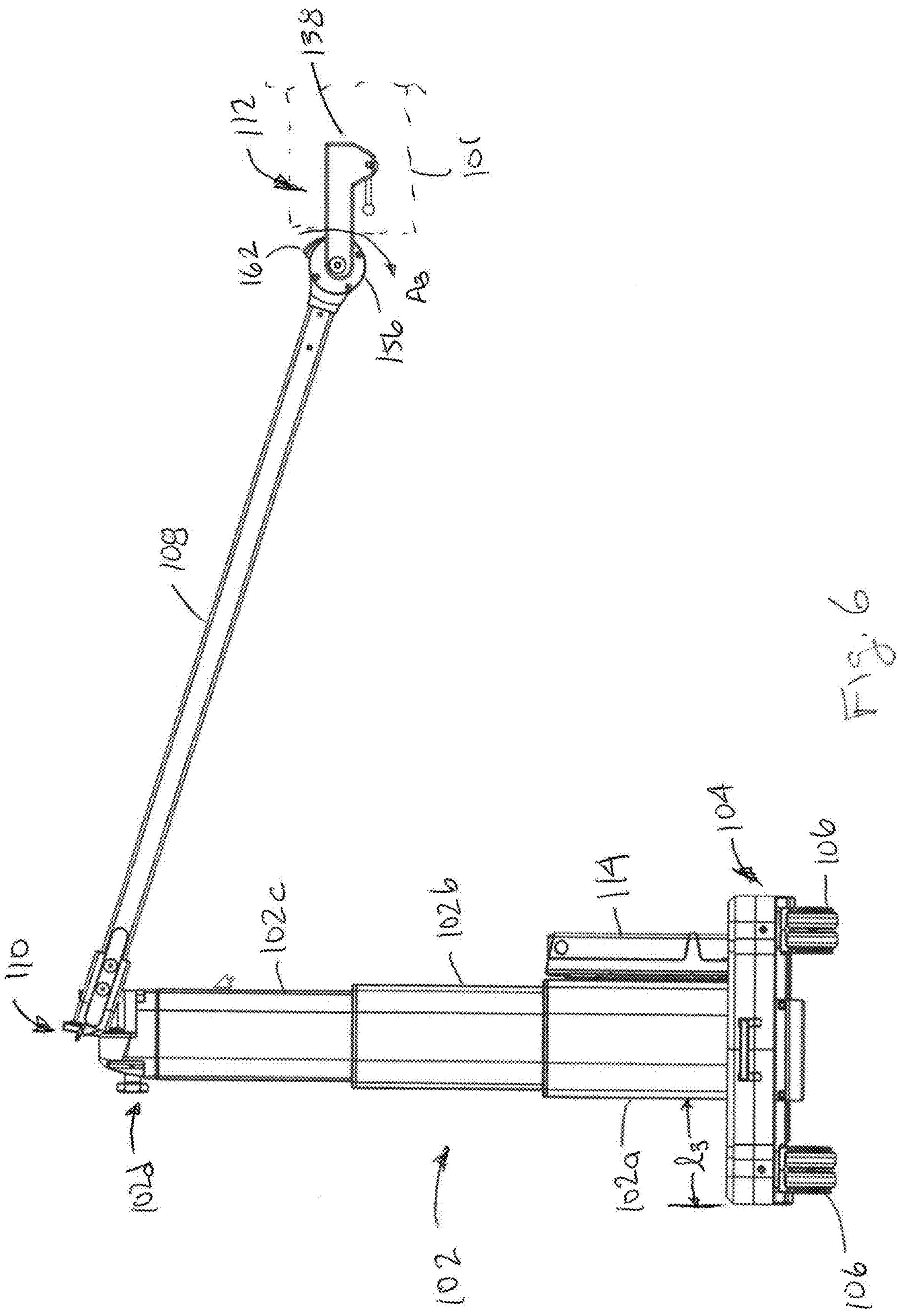
FIG. 6 illustrates the side view of the surgical table extension of FIG. 4 where the leg is raised.

Turning now to FIGS. 4-6, the leg 102 is shown in various states relative to the clamp assembly 112 (which are assumed to be fixed at a height of the surgical table rails in FIGS. 4-6). The surgical table is illustrated schematically by broken lines in FIGS. 4-6 and generally referred to by reference numeral 101. FIG. 4 illustrates the leg 102 having a first height in which the first and second rails 108 are substantially parallel with a floor upon which the base 104 rests, FIG. 5 illustrates the leg 102 being retracted from the state illustrated in FIG. 4 and having a second height, lower than the first height, in which the first and second rails 108 are inclined upwards towards the clamps 12, and FIG. 6 illustrates the leg 102 being extended from the state illustrated in FIG. 4 and having a third height, higher than the first height, in which the first and second rails 108 are inclined downwards towards the clamps 12. The leg 102 can be further positioned at any positions between those illustrated in FIGS. 5 and 6.

The leg 102 is extended and retracted by having telescoping sections 102*a*, 102*b*, 102*c* movable relative to each other by an actuation device (not shown). That is, an upper telescoping section of the telescoping sections 102*a*, 102*b*, 102*c* is fitted within an adjacent lower telescoping section and the actuator moves the telescoping sections 102*a*, 102*b*, 102*c* relative to each other to increase or decrease a height of the leg 102 relative to the base 104.

The actuation device can be any actuator known in the art for providing linear movement between telescoping sections, such as a screw and motor type actuation where the motor turns a stationary male screw that matingly engages with a female thread on each of the telescoping sections 102*a*, 102*b*, 102*c*. Although three telescoping sections 102*a*, 102*b*, 102*c* are illustrated, the leg 102 can have two telescoping sections or four or more telescoping sections.

The leg 102 (actuation device) is electrically powered to telescope relative to the base 104, which can use standard 120V AC power available in operating rooms/suites. Alternatively, the leg 102 (actuation device) can be battery powered through DC power, such as by a battery 114 provided on the leg 102 or base 104 and controlled through control pad 116 for controlling the up and down movement of the leg 102 by operator input to a desired height setting so that the first and second rails 108 can be kept level with the surgical table 101 (FIG. 4) or set to a required incline (FIGS. 5 and 6) for a given surgery and/or procedure. A stroke length of the leg 102 can be up to 900 mm or more.

Although the leg can be controlled by a wired control pad 116, the leg may further include Bluetooth connectivity, wireless input, coordinated input in line with table adjustments, or logic controllers to allow the first and second rails 108 to be set to a given incline and maintained as such while the table height changes. The leg can also set and/or maintain a predetermined incline using sensory feedback or react to a surgical table 101 height using sensory feedback.

Figure 7:
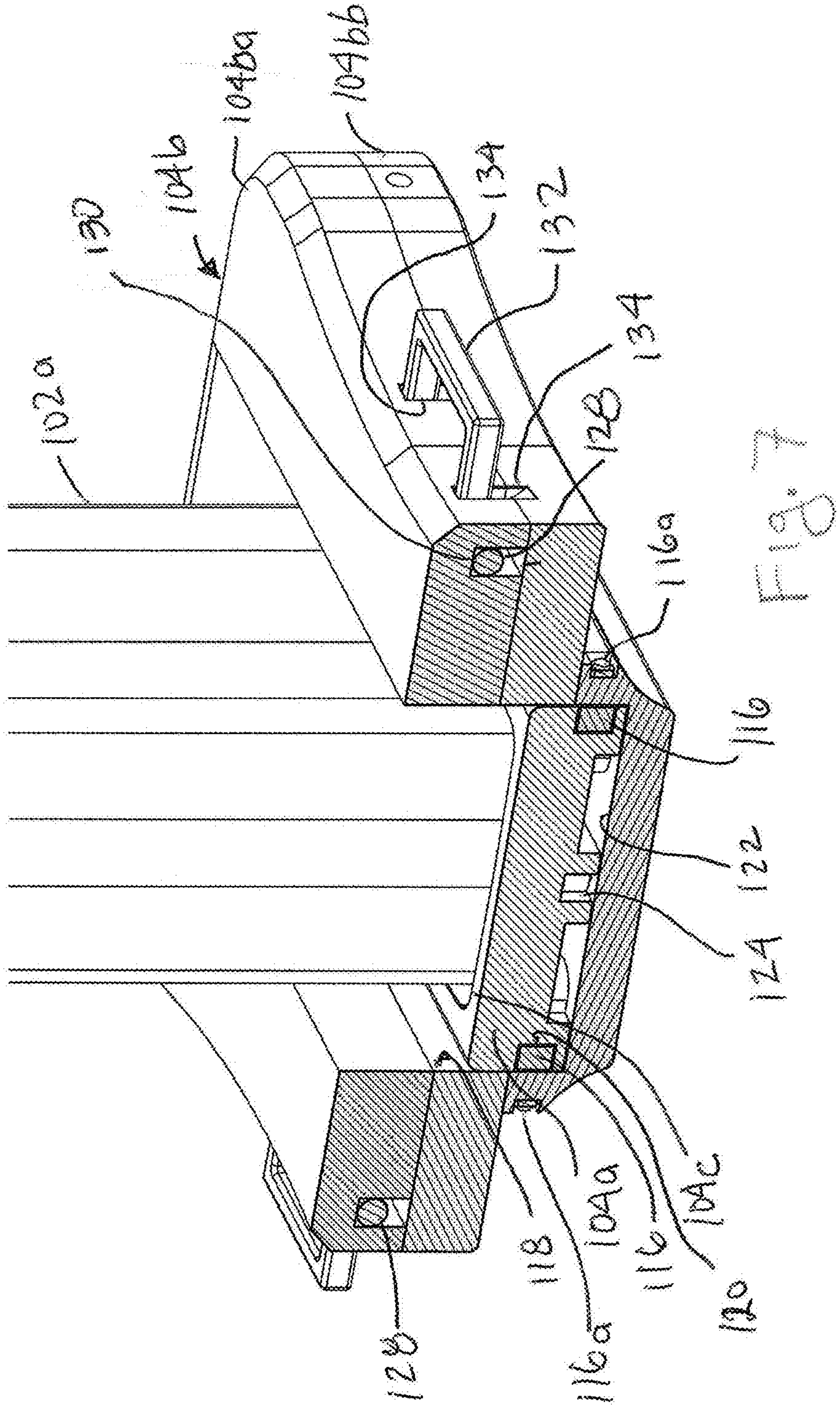
FIG. 7 illustrates a partial sectional view of the base of the surgical extension table of FIG. 1.
Figure 8:
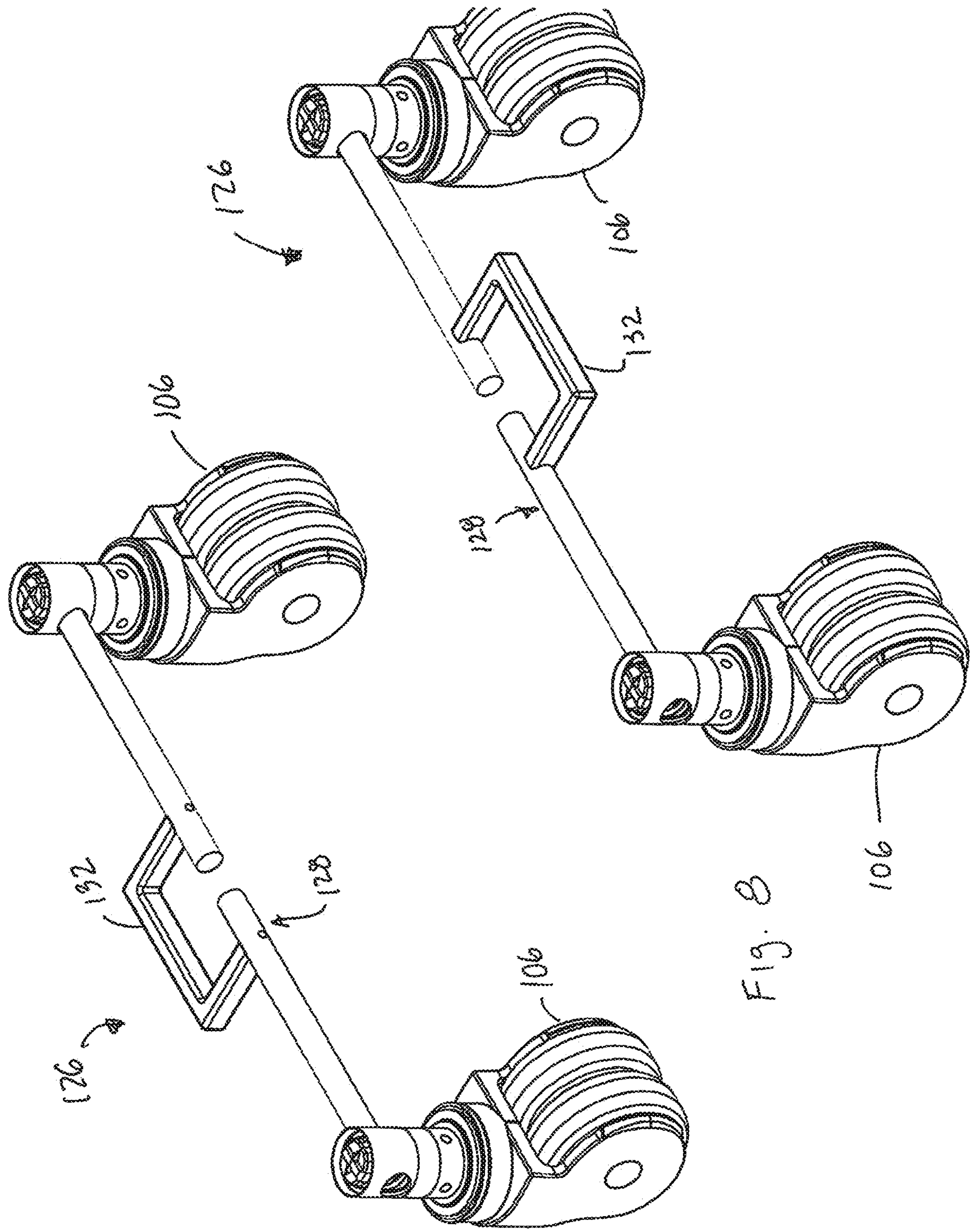
FIG. 8 illustrates a caster assembly used in the base of FIG. 1, where the casters are in an unlocked position.
Figure 9:
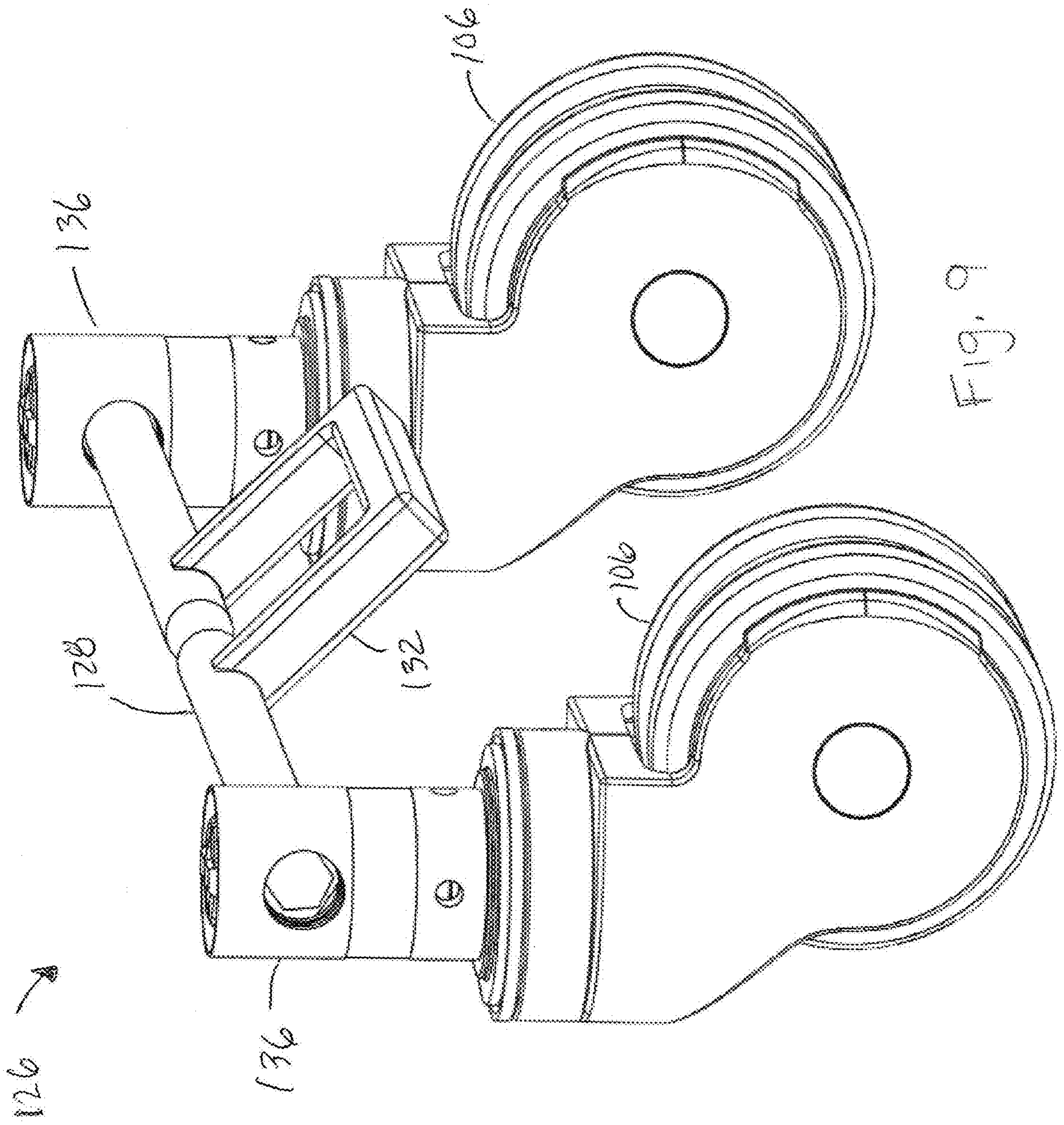
FIG. 9 illustrates a partial caster assembly of FIG. 8, where the casters are in a locked position.

Referring now to FIGS. 4-7, as well as FIG. 7, the leg 102 is linearly movable relative to the base 104 to permit passive movement of the leg 102 relative to the surgical table 101 when the first and second rails are inclined relative to the surgical table. As shown in FIGS. 4-6, the position of the leg 102 relative to the base 104 changes as the leg is retracted and extended (shown by distance 11 in FIG. 4, 12 in FIGS. 5 and 13 in FIG. 6, which vary according to the height of the leg 102 above the base 104).

As shown in FIG. 7, a lower portion of the telescoping section 102*a* of the leg 102 sits in a recess 104*c* of a carriage 104*a* that is movable relative to a base frame 104*b*. Linear bearings 116 are used to movably connect the carriage 104*a* relative to the base 102. Any type of linear bearing 116 known in the art can be used, such as an inner portion 118 of the base frame 104*b* having protruding ball bearings that are held on the inner portion 118 by a fastener 116*a* and which slide in a corresponding slot 120 in the tray 104*a*. The linear bearings 116 can also have a threaded male stem that directly threads into a mating threaded hole on the inner portion 118 of the base frame 104*b*. Furthermore, the linear bearing can be a simple low friction material rod provided on the inner portion 118 of the frame, which slides on the slot 120 on the carriage 104*a*. Linear bearings 116 can also be similarly configured and provided between a lower surface 122 of the base 104 and a corresponding slot 124 on a lower surface of the carriage 104*a*. The linear bearings 116 are configured to move the leg relative to the base 102 in a direction towards the surgical table 101 to passively adjust a position of the base 102 relative to the surgical table 101 when the leg 102 is extended and retracted. The carriage 104*a* can have up to 150 mm of linear movement or more.

Referring now to FIGS. 1 and 7-9, the base 102 further includes two caster assemblies 126. The base 102 holds the caster assemblies 126, which can each have a locked state and an unlocked state, as disclosed above. A locking rod 128 is rotatably disposed in a slot 130 provided in the upper frame 104*ba* and retains the locking rod 128 between and upper frame 104*ba* and a lower frame 104*bb* of the frame

104*b*. The locking rod 128 includes a pedal 132 that is movable with the rotation of the locking rod 128 within slots 134 formed in one or more of the upper frame 104*ba* and the lower frame 104*bb*. The pedal 132 is pushed down by applying pressure from a foot of a user to rotate the pedal 132 from the unlocked position shown in FIGS. 1, 7 and 8 to a locked position shown FIG. 9. When in the locked position, the pedal 132, in turn, rotates the locking rod 128 to actuate an internal mechanism (not shown) in a caster stem 136 of conventional locking casters 116 to lock the casters 116 and prevent movement of the base 104.

Figure 10:
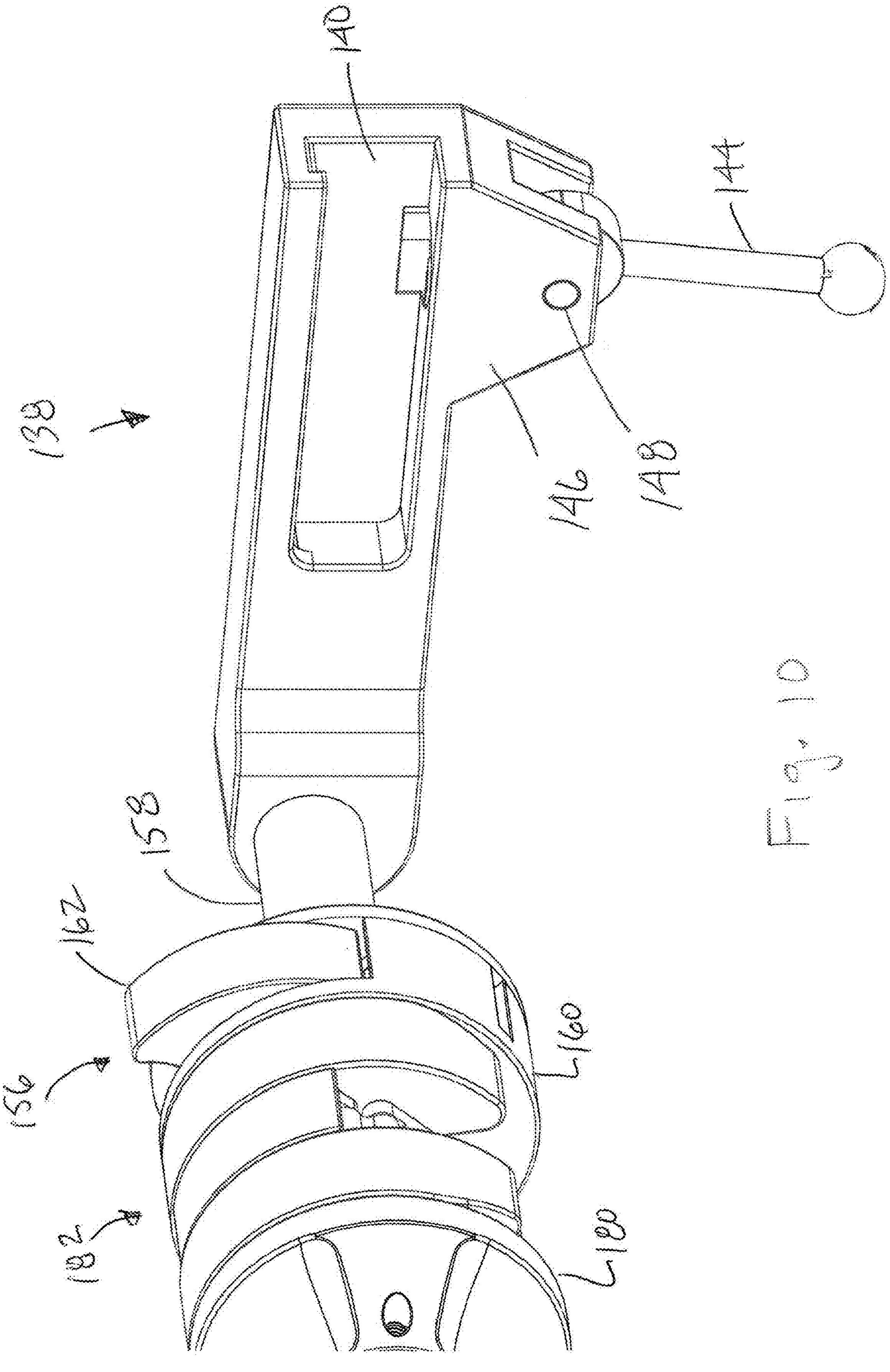
FIG. 10 illustrates a partial view of a slide rail assembly with a surgical table clamp in an unlocked position.
Figure 11:
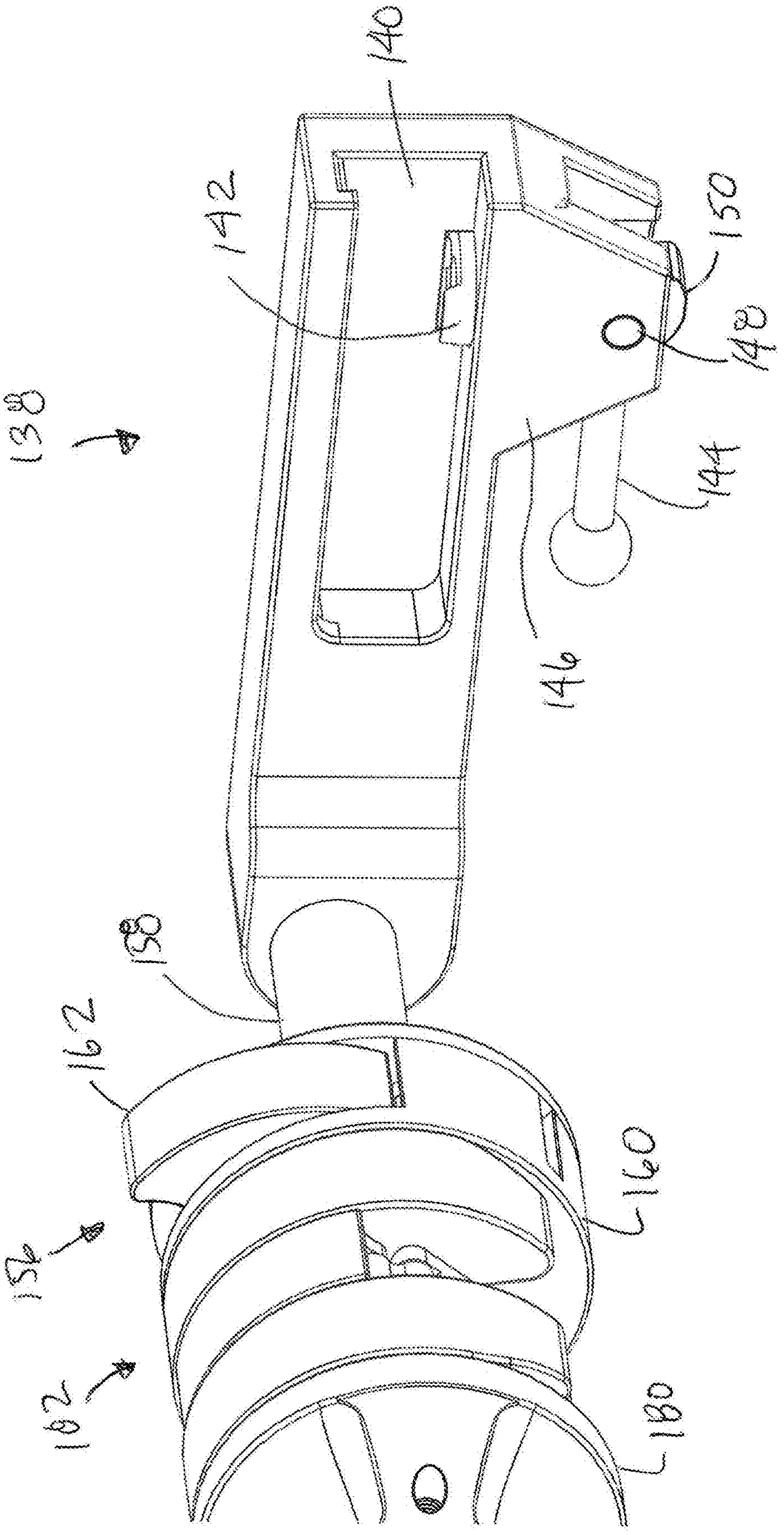
FIG. 11 illustrates the partial view of the slide rail assembly of FIG. 10 with the surgical table clamp in a locked position.

Referring now to FIGS. 10 and 11, the same illustrate a portion of clamp assembly 112 that attaches the surgical table extension 100 to the surgical table 101. Such portion includes a surgical table clamp 138 having a recess 140 for accepting a surgical table rail on the surgical table 101. Within the recess 140, a protrusion 142 is movable into and out from the recess to selectively lock the surgical table clamp 138 to the surgical table rail by actuation of a lever 144 rotatably held in a clamp body 146 about pivot pin 148. The lever 144 has a cam 150 which also rotates about the pivot pin 148 which slidingly engages with the protrusion 142 and to move the protrusion 142 into and out from the recess 140. The protrusion 142 can be biased into and retracted from the recess by a spring element. FIG. 10 illustrates the protrusion 142 withdrawn from the recess 140 allowing the surgical table rail to move within the recess 140 and FIG. 11 illustrates the protrusion 142 extending into the recess 140 to engage with the surgical table rail and lock the surgical table clamp 138 to the surgical table rail. A surgical table clamp 138 is provided at each end of the first and second rails 108 to fix the first and second rails 108 to corresponding first and second surgical table rails on the surgical table.

Referring now to FIGS. 12-17, there is illustrated another portion of the clamping mechanism provided between the free ends of the first and second rails 108 and the surgical table. The surgical clamps 138 are connected to ends of a cross-bar assembly 152. The cross-bar assembly 152 includes a crossbar 154, extension bars 158 and a collar 161 at each end, the collar 161 having an outer collar 160 with an end clamp 156 for locking and unlocking the extension bars 158 relative to the cross-bar 154 and an inner collar 180. In the cross-bar assembly 152, the extension bars 158 are slidably disposed along direction R and are prevented from rotating along axis $A_3$. That is, operation of the first and second end clamps 156, when unlocked, allow the extension bars 158 to extend and retract in direction R to align the surgical clamps 138 to the surgical table rails and to lock the extension bars 158 in position when locked.

Figure 12:
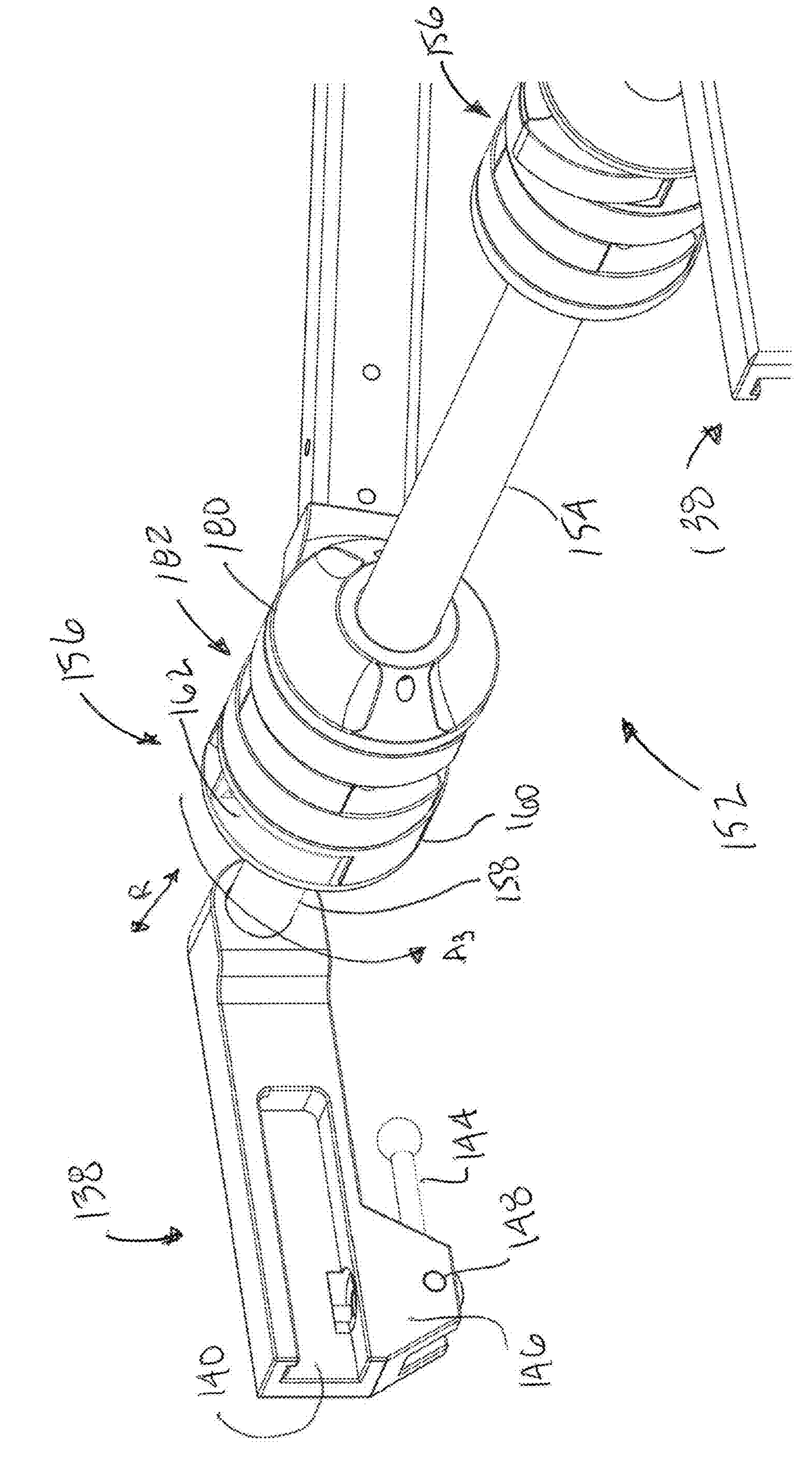
FIG. 12 illustrates a partial view of the slide rail assembly of FIG. 10 with the slide rail in a locked position.
Figure 13:
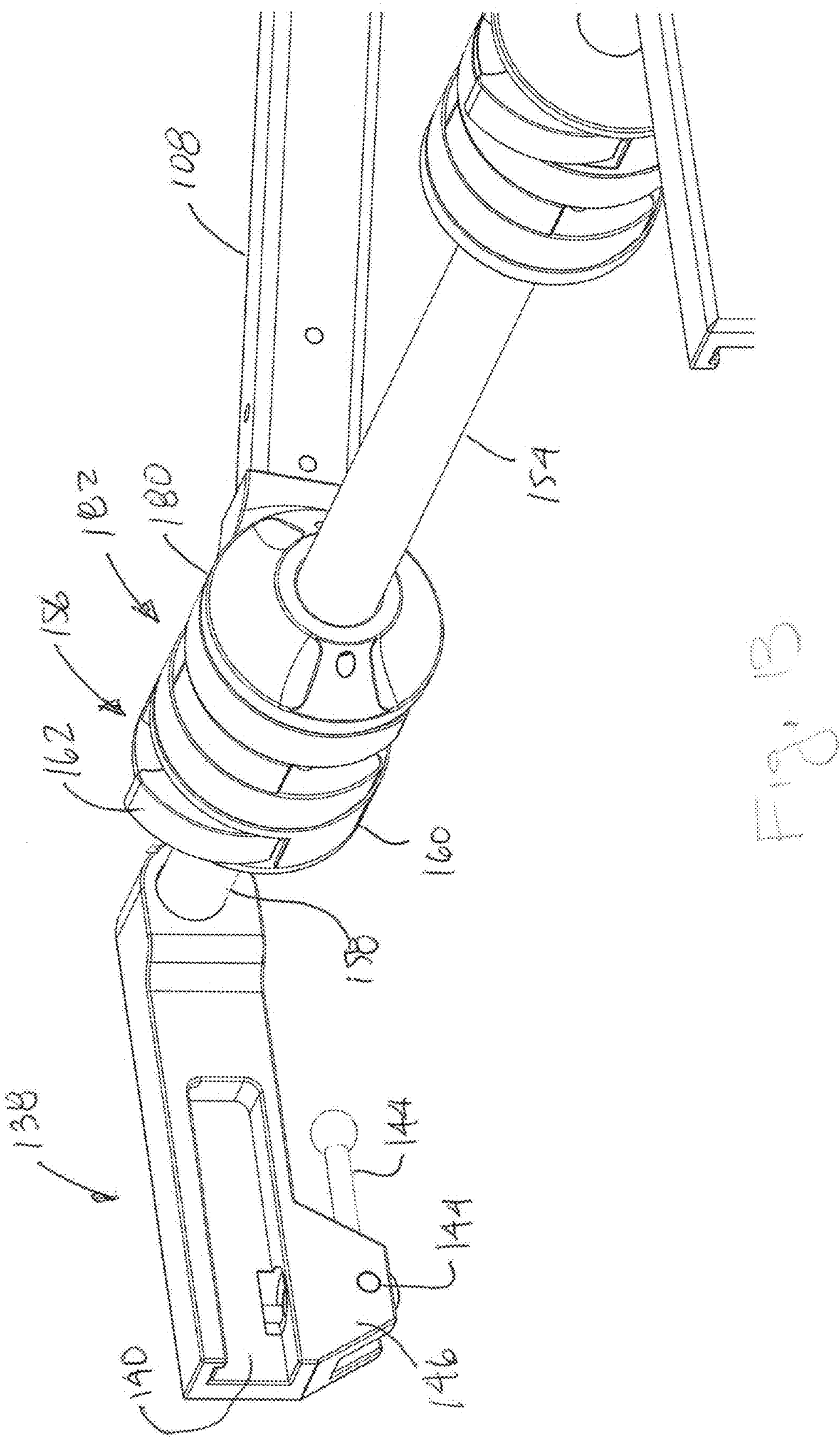
FIG. 13 illustrates the partial view of the slide rail assembly of FIG. 12 with the slide rail in an unlocked position.
Figure 14:
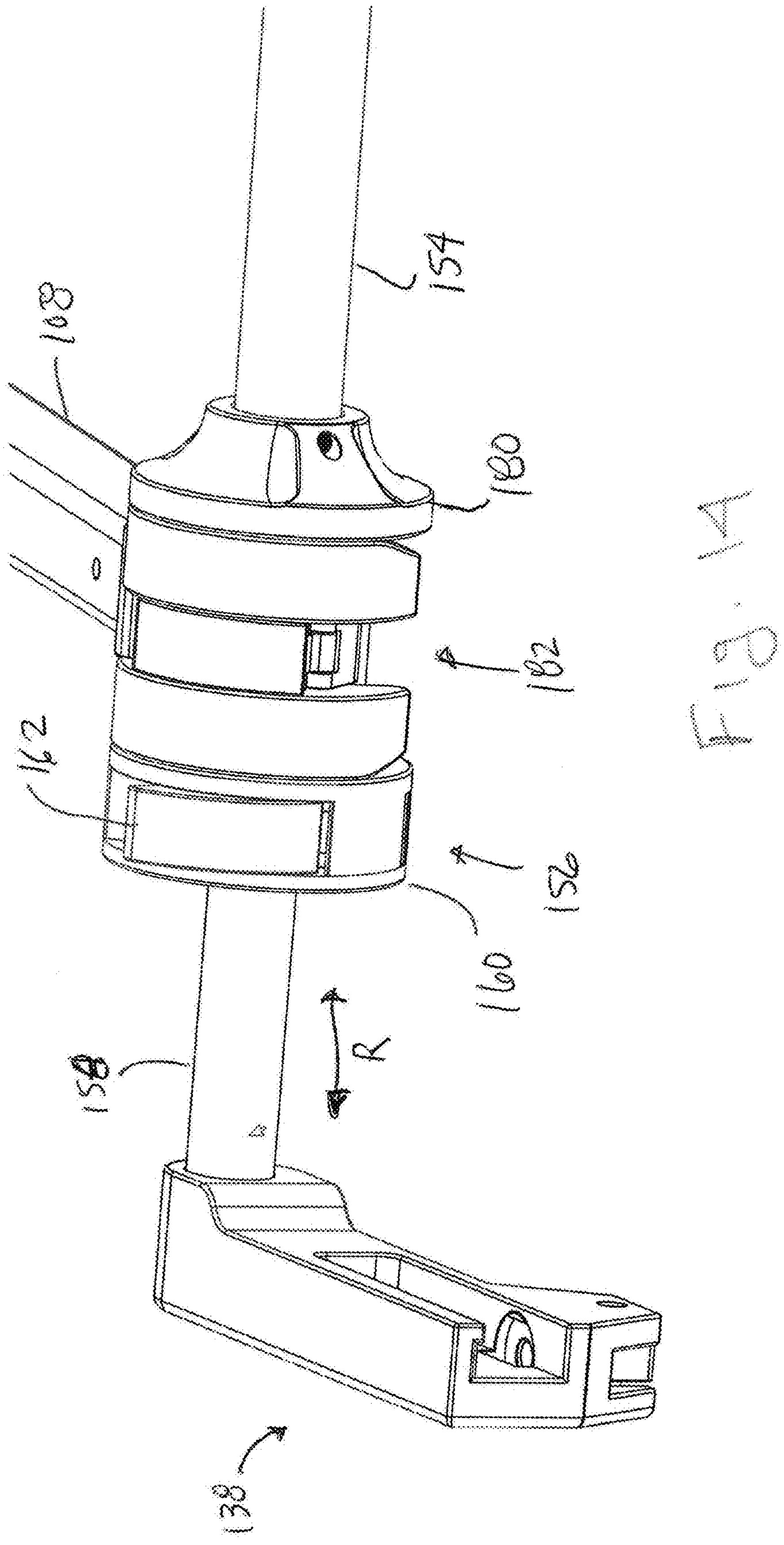
FIG. 14 illustrates a partial view of the slide rail assembly of FIG. 13 with the slide rail extended while in the unlocked position.

The outer collar 160 having an end clamp 156, along with inner collar 180, can be configured as the unitary collar 161 fixed at opposing ends of the cross-bar 154. FIG. 12 illustrates a locking lever 162 in a stored position having an outer surface flush with an outer surface of the outer collar 160 to lock the extension bars 158 in an extended or retracted position along direction R. FIG. 13 shows the locking lever 162 being depressed so as to extend outward from the outer surface of the outer collar 160 to set the extension bar 158 into an unlocked state to allow the extension bar 158 to extend and retract in direction R to align the surgical clamps 138 to the surgical table rails. FIG. 14 illustrates an extension bar 158 being extended when the corresponding end clamp 156 is in the unlocked position. FIGS. 4-6 illustrate the rail clamps 182 (discussed below) rotating relative to the outer collar 160 about axis $A_3$ when the leg 102 is raised and lowered relative to the base.

Figure 15:
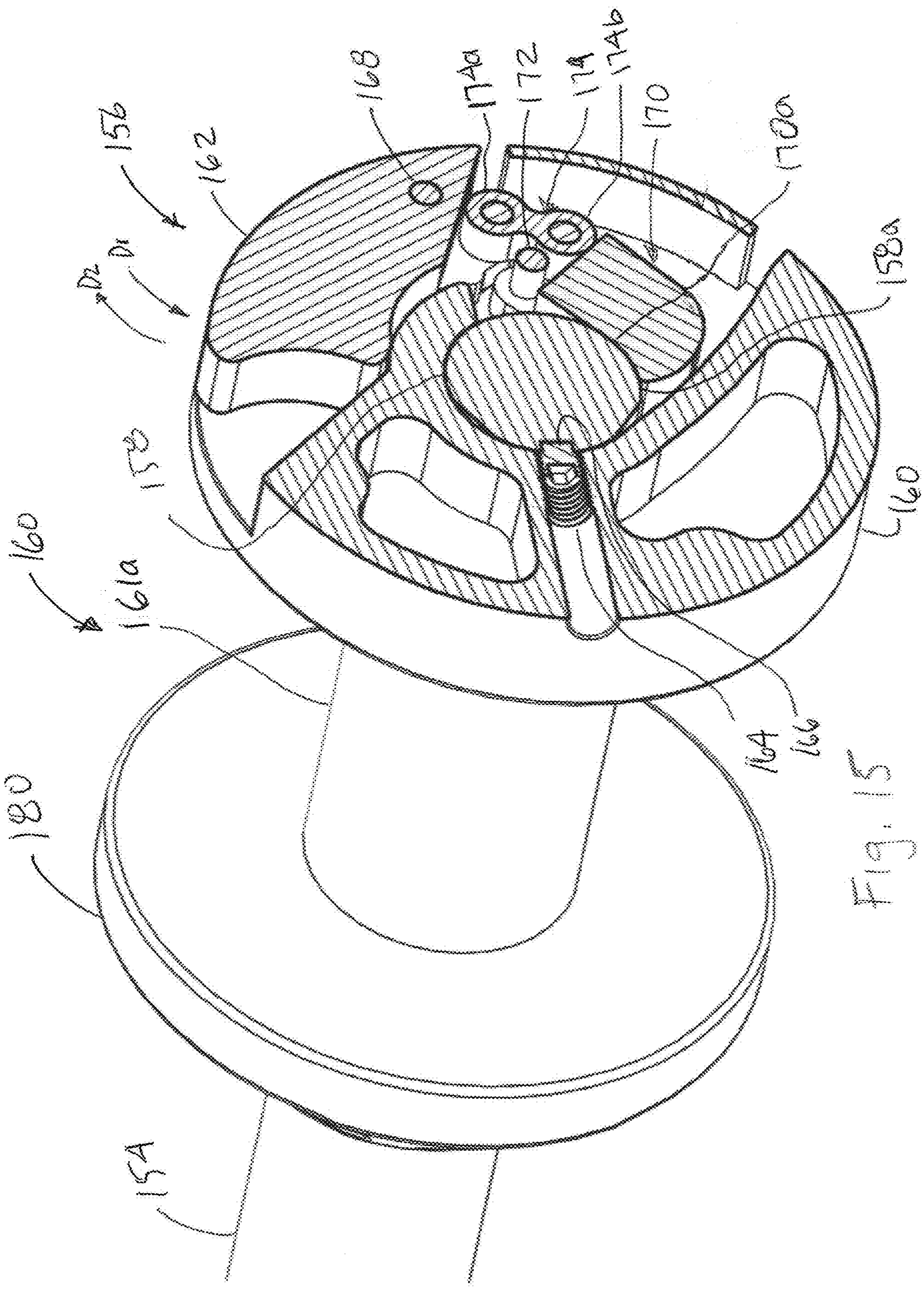
FIG. 15 illustrates a perspective sectional view of a locking mechanism for the slide rail, the slide rail in a locked position.
Figure 16:
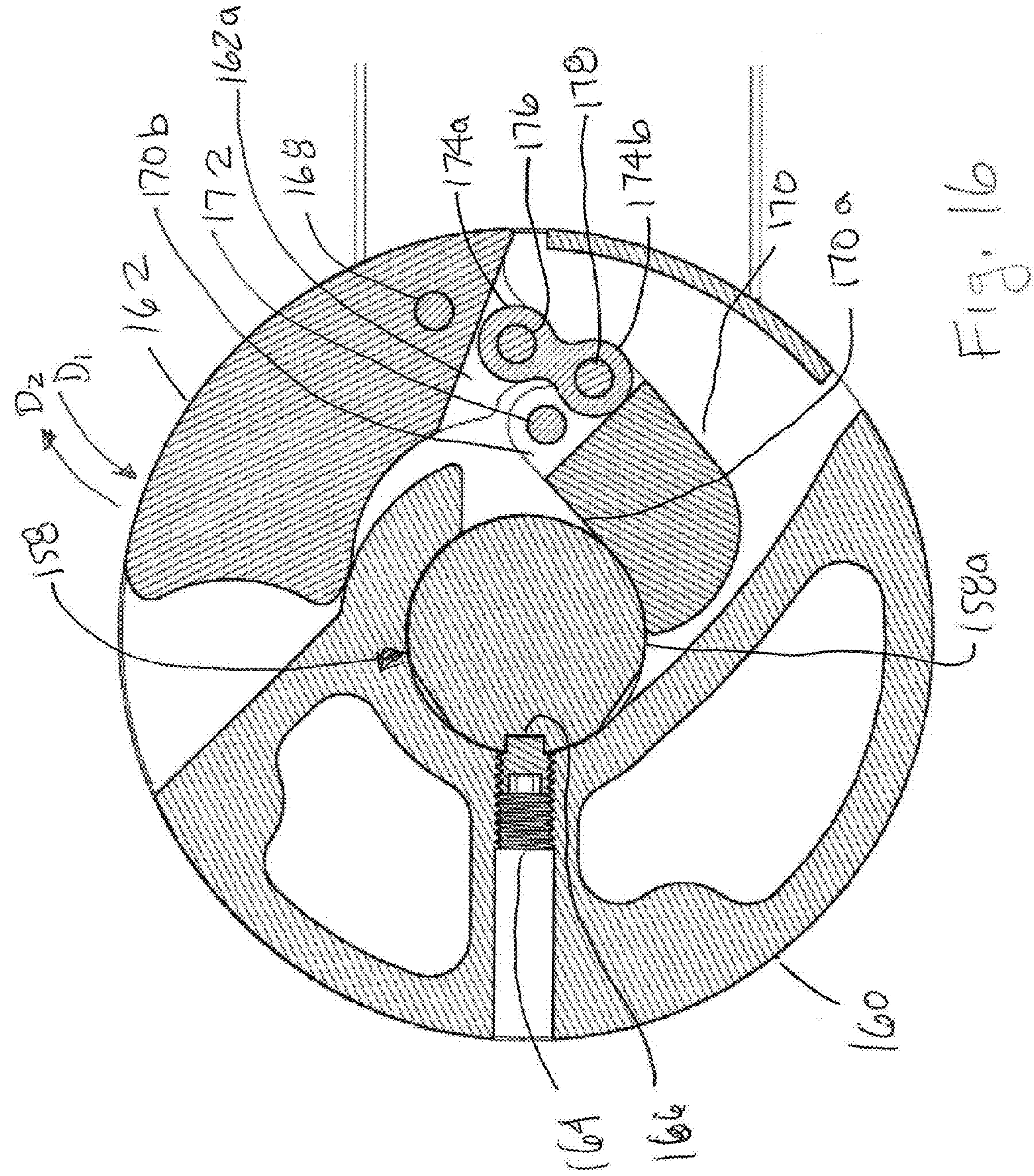
FIG. 16 illustrates a side section view of the locking mechanism for the slide rail, with the slide rail in a locked position.
Figure 17:
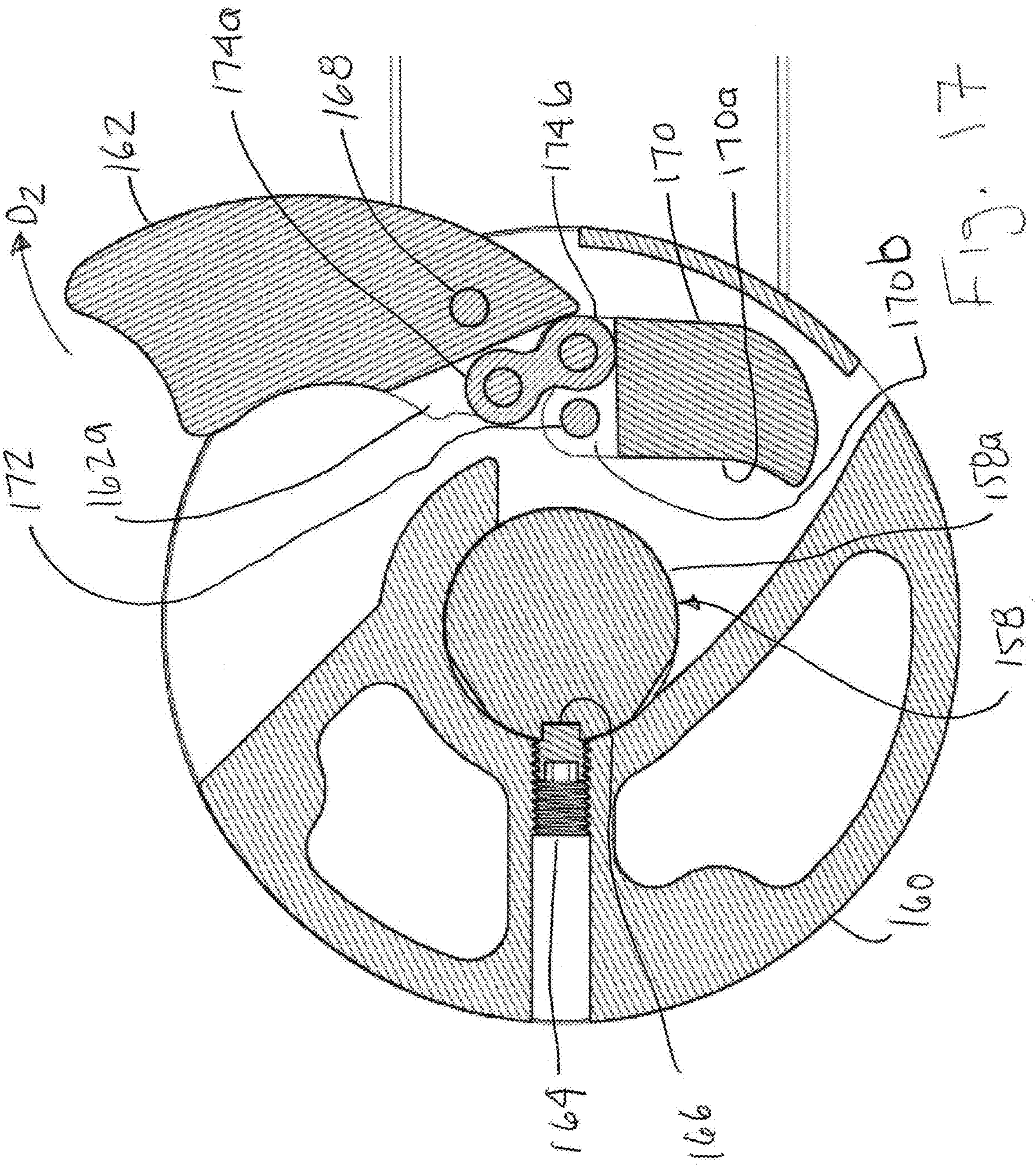
FIG. 17 illustrates the side section view of the locking mechanism of FIG. 16, with the slide rail in an unlocked position.

Referring now to FIGS. 15-17, there is illustrated cross-sectional views of the end clamps 156. Although one end clamp 156 is illustrated, each of the first and second end clamps are configured the same. The end clamp 156 locks the extension bar 158 relative to the cross-bar 154 along the direction R. The end clamp comprises an outer collar 160 as a clamp body fixed to the extension bar 158 by way of a set screw 164 and mating keyway 166 on the extension bar 158. The extension bar 158 extends into a tubular interior of the collar 161/cross-bar 154 and can slide relative to the cross-bar 154. The locking lever 162 can pivot relative to the clamp body 160 via pin 168. A pawl 170 can also pivot about pin 172 relative to the extension bar 158 between an unlocked position where a surface 170*a* of the pawl 170 is withdrawn from an outer surface 158*a* of the extension bar 158 and a locked position where the surface 170*a* of the pawl 170 is rotated to engage the outer surface of the extension bar 158 to lock the extension bar from moving in the R direction. The pawl 170 can be biased into the unlocked position by a spring, such as torsion spring positioned at the pivot 172.

An intermediary link 174 having a first end 174*a* engaged with the locking lever 162 and a second end 174*b* engaged with the pawl 170 such that the intermediary link 174 urges the pawl 170 into the locked position when the locking lever 162 is rotated in a first direction $D_1$ relative to the outer collar (i.e., clamp body) 160 and the pawl 170 is urged into the unlocked position when the locking lever 162 is rotated in a second direction $D_2$, opposite to the first direction $D_1$. The first end 174*a* of the intermediary link 174 is rotatably captured at a rotatable end 162*a* of the locking lever about pin 176 while the second end 174*b* of the intermediary link 174 is rotatably captured at a rotatable end 170*b* of the pawl 170 about pin 178.

FIGS. 15 and 16 illustrate the locking lever 162, intermediary link 174 and pawl 170 in a locked position while FIG. 17 illustrates the locking lever 162 urged outward into the unlocked position in which the pawl 170 is rotated away from contacting the outer surface of the extension bar 158.

Figure 18:
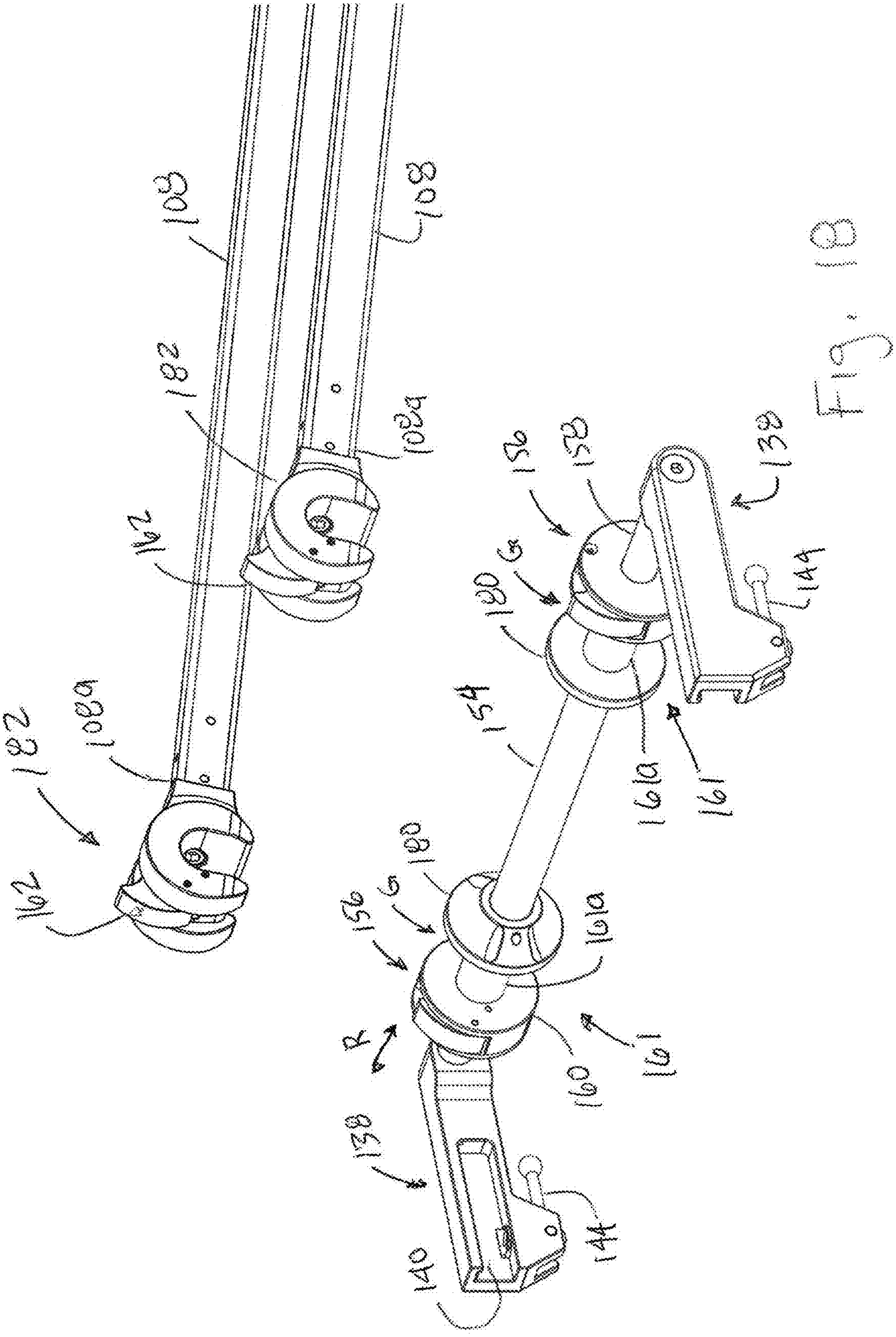
FIG. 18 illustrates a partial view of a surgical table clamping assembly with rail ends unattached to a cross-bar.
Figure 19:
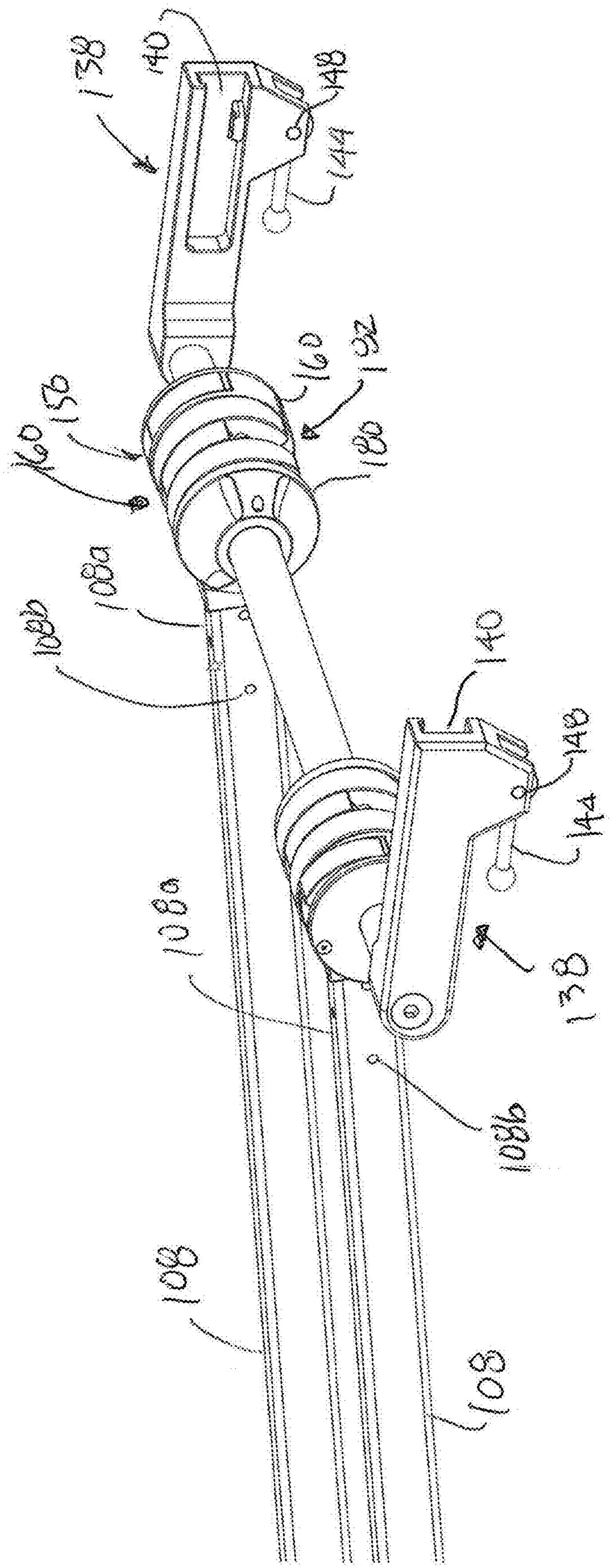
FIG. 19 illustrates a partial view of the surgical table clamping assembly with rail ends attached and locked to the cross-bar.

Referring now to FIGS. 18, 19, 20*a* and 20*b*, there is illustrated further components of the cross-bar assembly 152. The cross-bar assembly 152 further includes collar 160 having the inner collars 180 fixed in positions on the cross-bar 154, the inner collars 180 are positioned spaced apart from respective outer collars 160 having the end clamps 156 by collar cross-bar 161*a* to form gap G between the outer and inner collars 160, 180. Further, free ends 108*a* of the first and second rails 108 have rail clamps 182 for independently clamping the free ends 108*a* of the first and second rails 108 to the collar cross-bar 161*a*. The rail clamps 182 can be fastened to the free ends 108*a* of the first and second rails 108 by any means known in the art, such as fasteners 108*b*. The rail clamps 182 are dimensioned in the direction R to fit within the fixed gap G between the outer and inner collars 160, 180. The rail clamps 182 are each rotatable about a center axis of the collar cross-bar 161*a* (axis $A_3$). When disposed on the collar cross-bar 161*a*, the rail clamps 182 can be set to either a locked state in which the rail clamps 182 are rotatably retained on the collar 161 of cross-bar assembly 152 or can be freely removed from or set onto the collar 161 when in the unlocked state. FIG. 18 illustrated the rail clamps 182 in an unlocked state being set onto the collar 161 while FIG. 19 illustrates the rail clamps 182 rotatably retained on the collar 161.

Figure 20B:
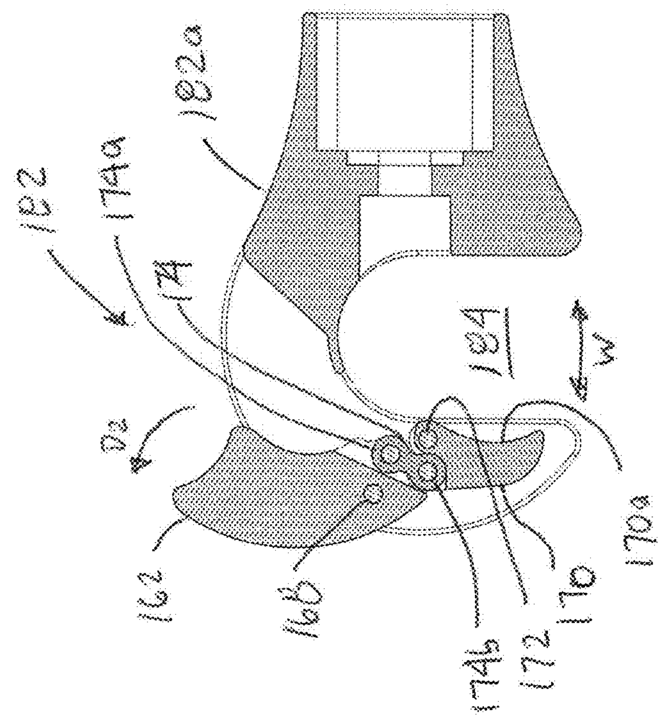
FIGS. 20*a* and 20*b* illustrate sectional views of a rail clamp assembly in a locked and unlocked position, respectively.
Figure 20A:
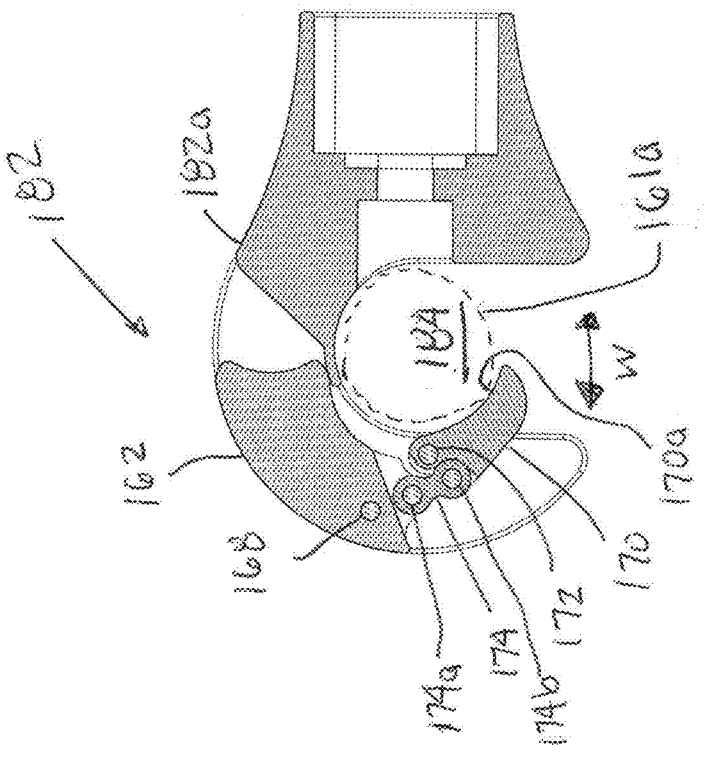

As shown in FIGS. 20*a* and 20*b*, the rail clamps 182 are similarly configured to the end clamps 156, in that they each have similarly configured locking levers 162, pawls 170 and intermediary members 174 arranged similarly relative to each other as described above with regard to the end clamps 156. However, a clamp body 182*a* of the rail clamps 182 include a slot 184 having a similar width in the W direction as a diameter of the cross-bar 154 so as to fit over the collar cross-bar 161*a* (shown as a broken line in FIG. 20*a*) and within gap G in the R direction. In the locked position shown in FIG. 20*a*, the surface 170*a* of the pawl 170 is extended into the slot 184 to prevent the collar cross-bar 161*a* (i.e., engage the collar cross-bar) from moving out of the slot 184. As shown in FIG. 20*b*, in the unlocked position, a surface 170*a* of the pawl 170 is withdrawn from the slot 184 allowing the rail clamps 182 to be removed from the collar cross-bar 161*a* or placed on the collar cross-bar 161*a* prior to being locked thereon. The outer collar 160 and inner collar 180 prevent the rail clamp 182 from moving relative to the cross-bar 154 in the R direction.

Figure 21A:
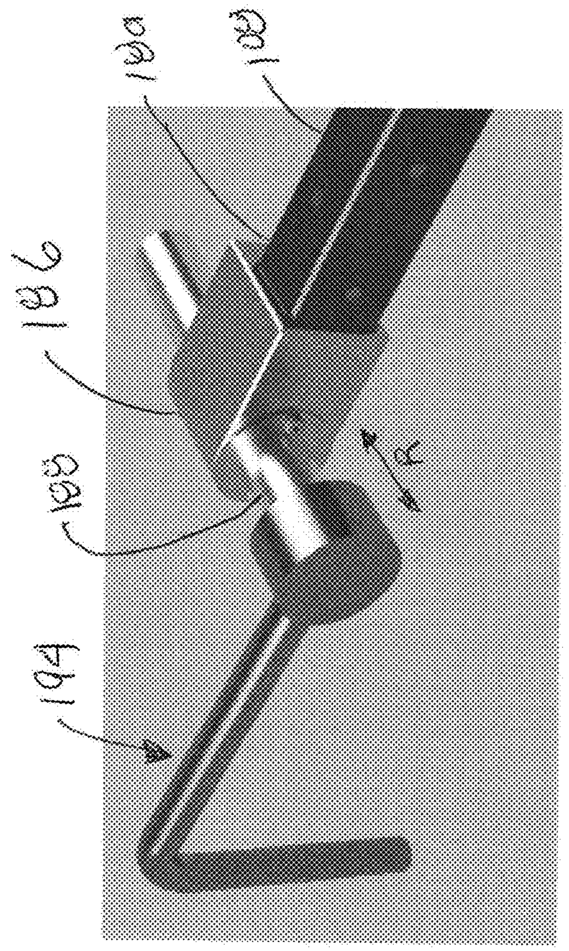
FIGS. 21*a* and 21*b* illustrate an alternative configuration of a surgical table clamping assembly.
Figure 21B:
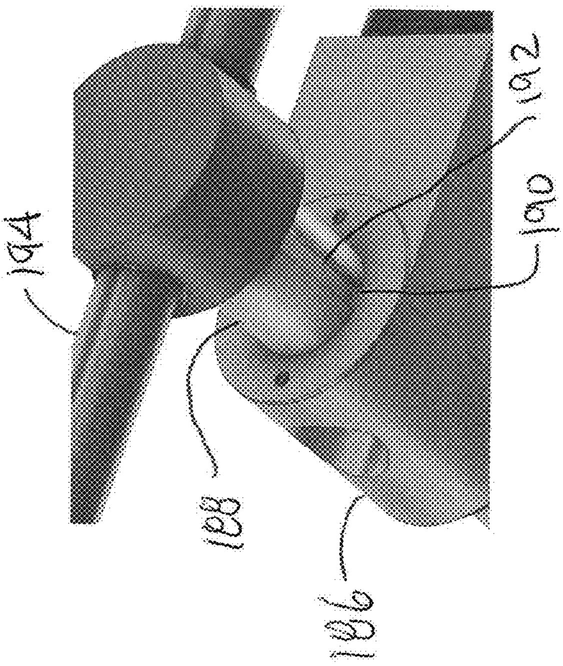
Figure 22B:
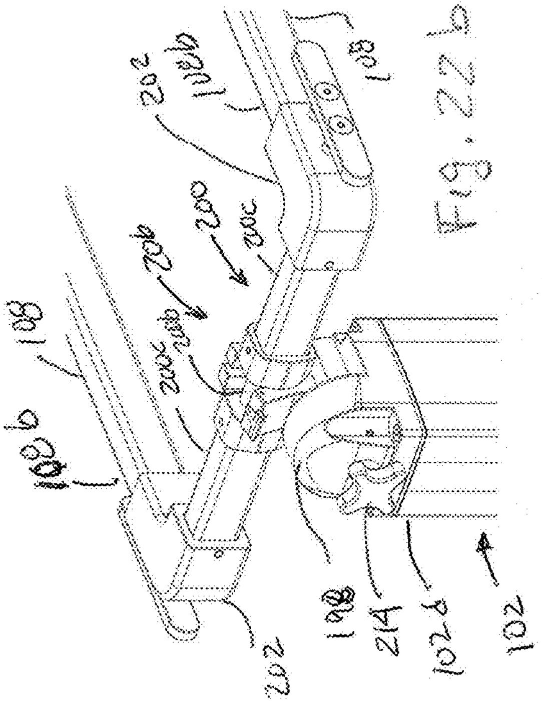
FIGS. 22*a*-22*d* illustrate a base-side cross-bar clamping assembly.
Figure 22D:
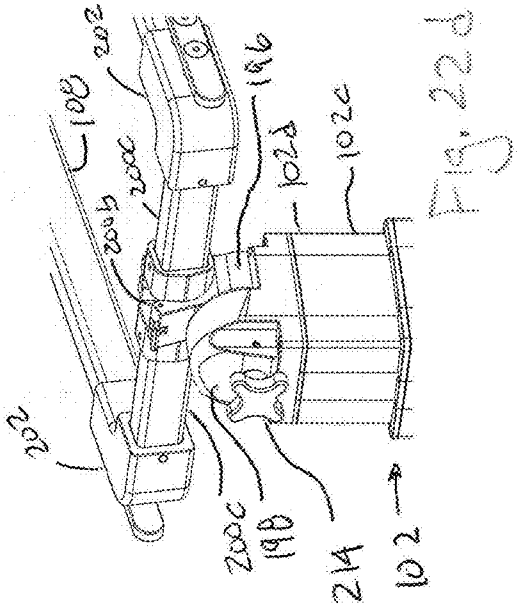
Figure 22A:
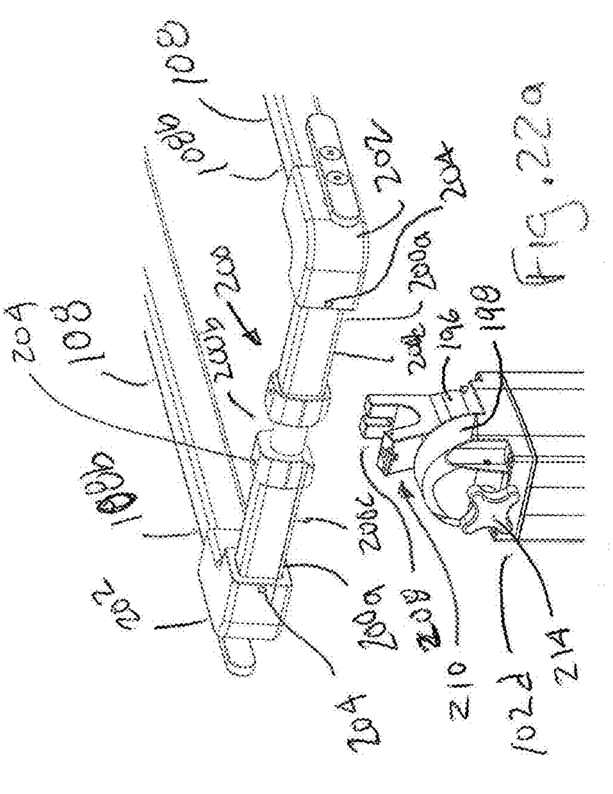
Figure 22C:
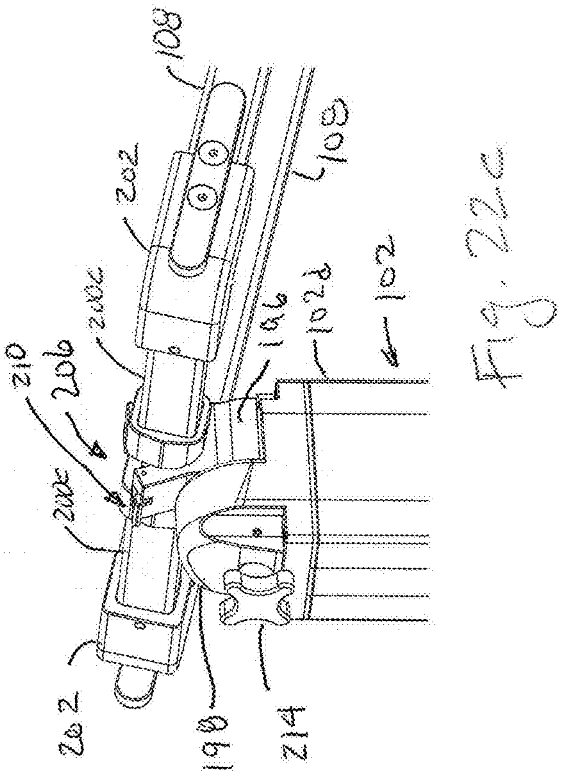

FIGS. 21*a* and 21*b* illustrate alternative configurations of the end, rail and surgical clamps described above. In FIGS. 21*a* and 21*b*, a cap 186 is provided on the free ends 108*a* of the rails 108. The cap 186 holds extension bars 188 so as to be slidable in the R direction. A key 190 formed in or on the cap 186 and mating keyway 192 formed in the extension bar 188 can be provided to prevent rotation of the extension bar 188 relative to the cap 186. Clamp bars 194 are provided corresponding to each rail 108 for attaching to the surgical table via conventional surgical table clamps (i.e., 16-20 mm round posts or ¼" blade fittings). A bushing (not shown) can be provided in the cap 186 for accepting the extension bar 188 to facilitate easy sliding of the extension bar 188 relative to the cap 186.

Referring now to FIGS. 22*a*-22*d*, 23*a* and 23*b*, the hinge 110 is illustrated as being rotatable in at least a first axis $A_1$ and also about a second axis $A_2$. The hinge 110 is disposed on a top end 102*d* (opposite the base) of the leg 102. The hinge 110 attaches to the first and second rails 108 via a base-side cross-bar 200. The base-side cross-bar 200 connecting two other ends 108*b* (opposed to ends 108*a*) of the rails 108 through corner connectors 202 having one side accepting the other ends 108*b* of the rails 108 and another side accepting ends 200*a* of the base-side cross-bar 200 such as by fasteners 204. The base-side cross-bar 200 can have a central portion 200*b* having a circular cross-section and first and second end portions 200*c* having non-circular cross-sections, where the central portion 200*b* is a central coupling connecting the first and second end portions, such as through fasteners 204.

The hinge having a base-side clamp 206 disposed at an end of a rotatable shaft 196. The base-side clamp 206 having a slot 208 for acceptance of the central portion 200*b* of the base-side cross-bar 200 such that the central portion 200*b* of the base-side cross-bar 200 rotates about the first axis relative to the slot 208. The base-side clamp 206 can have a locking mechanism 210 for locking the central portion 200*b* of the base-side cross-bar 200 in the slot 208 while permitting rotation of the central portion 200*b* of the base-side cross-bar 200 about the first axis $A_1$. The locking mechanism 210 can have a pawl 212 and a spring member that biases a first end 212*a* of the pawl 212 into the slot 208 and locking the central portion 200*b* of the base-side cross-bar 200 in the slot 208 by interfering with removal of the same from the slot 208. The pawl has a second end 212*b*, which when pressed rotates the first end 212*a* of the pawl from the slot 208 against a biasing force of the spring member to permit entry or removal of the central portion 200*b* of the base-side cross-bar 200 into and from the slot 208. The ends of the slot 208 are angled outward away from the slot to facilitate easy removal and entry of the central portion 200*b* of the base-side cross-bar 200 into and from the slot 208.

Figure 23B:
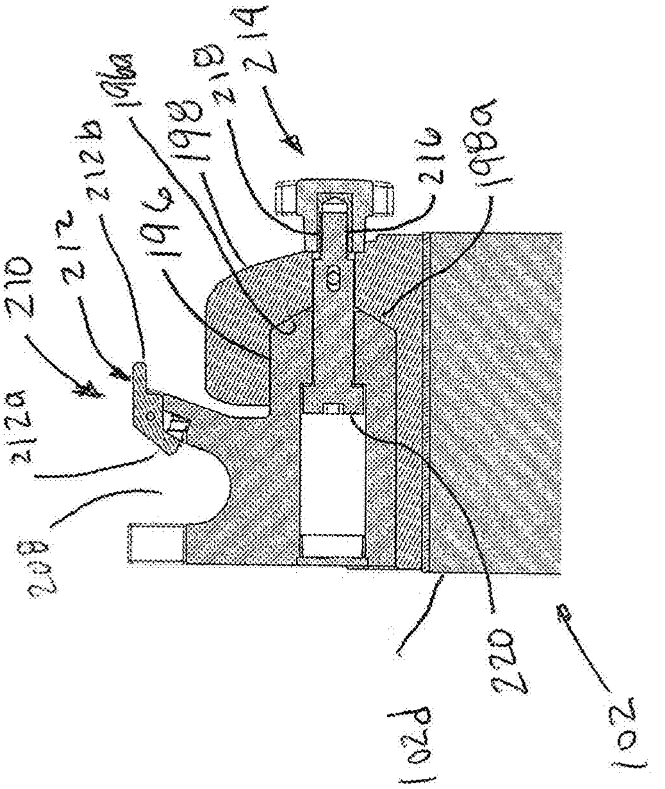
FIGS. 23*a* and 23*b* illustrate a base portion of the base-side cross-bar clamping assembly of FIGS. 22*a*-22*d*.
Figure 23A:
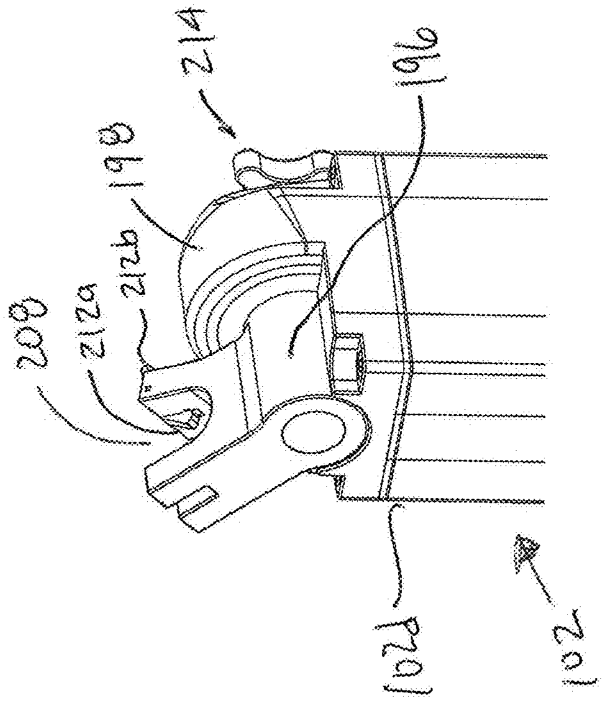

As shown in FIG. 23*b* (FIGS. 23*a* and 23*b* shown without the central portion 200*b* of the base-side cross-bar 200), the shaft 196 is rotatably captured in a body 198 at the end 102*d* of the leg 102 such that the shaft 196 rotates about the second axis $A_2$. The shaft 196 includes a locking knob 214 for locking the shaft 196 and the base-side cross-bar 200 in a position in the second axis $A_2$ rotation position. The locking knob 214 has a female thread 216 attached to a corresponding male threaded end 218 of a fastener 220. Tightening the locking knob 214 pulls a tapered surface 196*a* of the shaft 196 against a mating tapered surface 198*a* of the body 198 to provide resistance to rotation of the base-side crossbar 200 (and rails 108 attached thereto) about the second axis $A_2$. Continuing to tighten the locking knob 214 can lock the base-side crossbar 200 from rotating about the second axis $A_2$.

Figure 24:
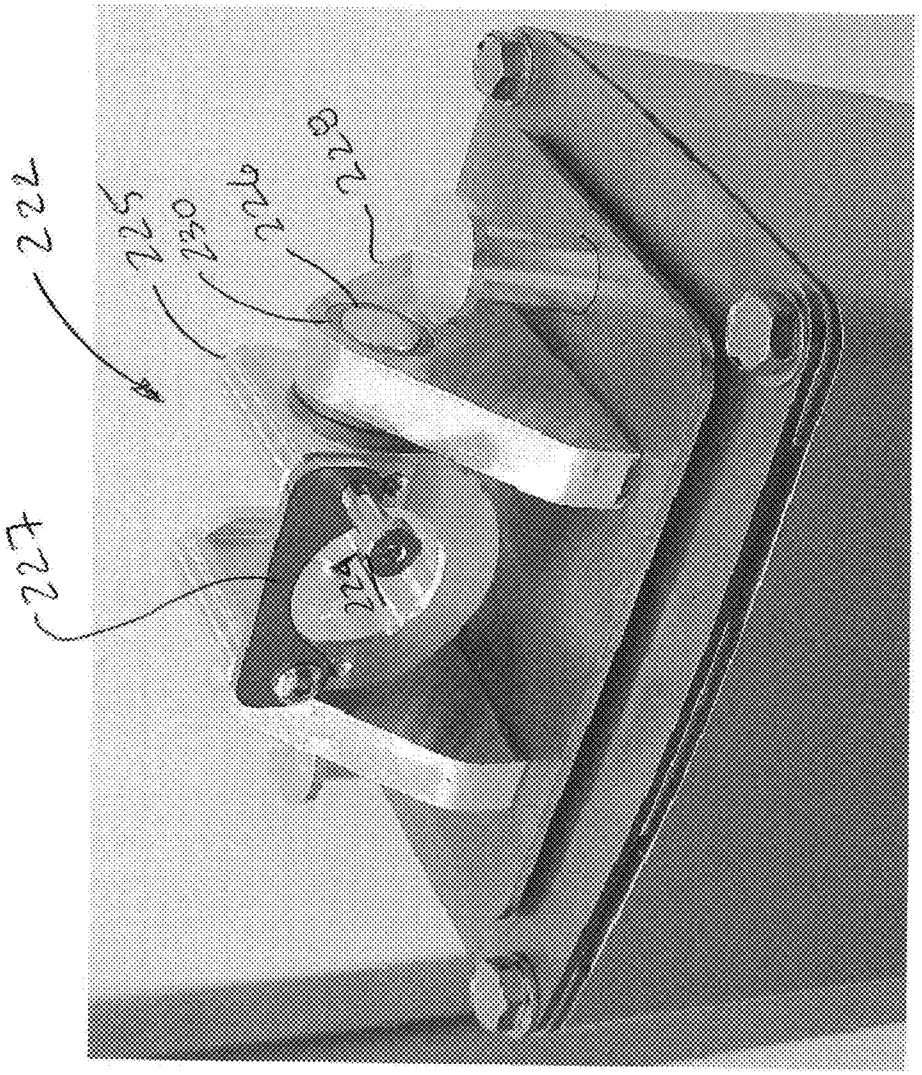
FIG. 24 illustrates an alternative configuration of a base portion of a base-side cross-bar clamping assembly.

Referring next to FIG. 24, there is shown an alternative embodiment of the hinge, generally referred to by reference number 222. In the alternative embodiment of FIG. 24, the hinge 222 allows for rotation about axes $A_1$ and $A_2$. Hinge 222 is also fastened to the top 102*d* of the leg 102. In such configuration, the base-side cross-bar has a rod extending towards the hinge 222 and rotatably captured in hole 224 in a first base member 225 to permit rotation about axis $A_2$. A circumferential slot can be provided on the extending rod where the movable plate 227 is captured within the slot to permit such rotation about axis $A_2$. Pivot pin 226 disposed in a second base 228 rotatably holds the first base 225 relative to the second base 228 to permit rotation of the base-side cross-bar (and the rails attached thereto) about the first axis $A_1$. A bearing, such as a bushing 230, can be provided between the second base 228 and the pin 226 to facilitate rotation about the first axis $A_1$.

While there has been shown and described what is considered to be embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A surgical table extension for use with a surgical table, the surgical table extension comprising:
- a leg comprising a base;
- first and second rails extending from the leg;
- a hinge disposed on the leg, the hinge is configured to permit movement of the first and second rails about at least a first axis relative to the leg;
- a cross-bar connecting respective ends of the first and second rails; and
- first and second clamps configured to clamp the cross-bar to the surgical table, each of the first and second clamps comprising:
  - an extension bar slidably disposed relative to the cross-bar for moving the first and second clamps in a direction orthogonal to an extending direction of the first and second rails to accommodate a width of the surgical table;
  - a first lock for independently locking the extension bar relative to the cross-bar; and
  - a second lock for independently locking the respective first and second clamps to the surgical table;

wherein the first and second clamps being fixed to the respective ends of the extension bar such that the first and second clamps move together with the extension bar.

2. The surgical table extension of claim 1, wherein the first lock comprises:

a clamp body;

a locking lever rotatable relative to an outer surface of the clamp body;

a pawl movable relative to an outer surface of the cross-bar between an unlocked position where a surface of the pawl is withdrawn from the outer surface of the cross-bar and a locked position where the surface of the pawl is extended to engage the outer surface of the cross-bar; and an intermediary link having a first end engaged with the locking lever and a second end engaged with the pawl such that the intermediary link urges the pawl into the locked position when the locking lever is rotated in a first direction relative to the clamp body and the pawl is urged into the unlocked position when the locking lever is rotated in a second direction, opposite to the first direction.

3. The surgical table extension of claim 1, further comprising third and fourth clamps disposed on respective ends of the first and second rails for clamping the respective ends of the first and second rails to the cross-bar.

4. The surgical table extension of claim 3, wherein the third and fourth clamps are each rotatable about a center axis of the cross-bar.

5. The surgical table extension of claim 4, wherein each of the third and fourth clamps comprise a third lock for independently locking each of the third and fourth clamps to the cross-bar while permitting rotation of the third and fourth clamps about the center axis of the cross-bar.

6. The surgical table extension of claim 5, wherein the third lock comprises:

a clamp body having a slot for acceptance of the cross-bar;

a locking lever rotatable relative to an outer surface of the clamp body;

a pawl movable relative to the slot between an unlocked position where a surface of the pawl is withdrawn from the slot and a locked position where the surface of the pawl is extended into the slot to engage the cross-bar; and an intermediary link having a first end engaged with the locking lever and a second end engaged with the pawl such that the intermediary link urges the pawl into the locked position when the locking lever is rotated in a first direction relative to the clamp body and the pawl is urged into the unlocked position when the locking lever is rotated in a second direction, opposite to the first direction.

7. The surgical table extension of claim 5, wherein the cross-bar further comprises first and second collars, each third lock being disposed between each first lock and a respective one of the first and second collars to prevent movement of the third lock in a center axis direction of the cross-bar.

8. The surgical table extension of claim 5, further comprising third and fourth clamps disposed on respective ends of the first and second rails for clamping the respective ends of the first and second rails to the cross-bar;

wherein each of the third and fourth clamps comprise a third lock for independently locking each of the third and fourth clamps to the cross-bar while permitting rotation of the third and fourth clamps about the cross-bar.

9. The surgical table extension of claim 8, wherein the third lock comprises:

a clamp body having a slot for acceptance of the cross-bar;

a locking lever rotatable relative to an outer surface of the clamp body; and a pawl movable relative to the slot between an unlocked position where a surface of the pawl is withdrawn from the slot and a locked position where the surface of the pawl is extended into the slot to engage the cross-bar.

10. The surgical table extension of claim 9, wherein the third lock further comprises an intermediary link having a first end engaged with the locking lever and a second end engaged with the pawl such that the intermediary link urges the pawl into the locked position when the locking lever is rotated in a first direction relative to the clamp body and the pawl is urged into the unlocked position when the locking lever is rotated in a second direction, opposite to the first direction.

11. The surgical table extension of claim 5, wherein each third lock being fixed to prevent movement of the third lock in a center axis direction of the cross-bar.

12. The surgical table extension of claim 1, wherein the first lock comprises:

a clamp body; and a locking lever rotatable relative to an outer surface of the clamp body.

13. The surgical table extension of claim 12, wherein the first lock further comprises a pawl movable relative to an outer surface of the cross-bar between an unlocked position where a surface of the pawl is withdrawn from the outer surface of the cross-bar and a locked position where the surface of the pawl is extended to engage the outer surface of the cross-bar.

14. The surgical table extension of claim 13, wherein the first lock further comprises an intermediary link having a first end engaged with the locking lever and a second end engaged with the pawl such that the intermediary link urges the pawl into the locked position when the locking lever is rotated in a first direction relative to the clamp body and the pawl is urged into the unlocked position when the locking lever is rotated in a second direction, opposite to the first direction.

15. The surgical table extension of claim 1, wherein the first lock further comprises a pawl movable relative to an outer surface of the cross-bar between an unlocked position where a surface of the pawl is withdrawn from the outer surface of the cross-bar and a locked position where the surface of the pawl is extended to engage the outer surface of the cross-bar.

16. A surgical table for use with a surgical table, the surgical table extension comprising:

a leg comprising a base;

first and second rails extending from the leg;

a hinge disposed on the leg, the hinge is configured to permit movement of the first and second rails about at least a first axis relative to the leg;

a cross-bar connecting respective ends of the first and second rails; and first and second clamps configured to clamp the cross-bar to the surgical table, each of the first and second clamps comprising:

an extension bar slidably disposed relative to the cross-bar for moving the first and second clamps in a direction orthogonal to an extending direction of the first and second rails to accommodate a width of the surgical table;

a first lock for independently locking the extension bar relative to the cross-bar; and a second lock for independently locking the respective first and second clamps to the surgical table;

wherein each of the extension bars is configured to be locked relative to a respective first and second lock at any position along a length of each extension bar.

17. The surgical table extension of claim 16, wherein the first lock comprises:

a clamp body; and a locking lever rotatable relative to an outer surface of the clamp body.

18. The surgical table extension of claim 17, wherein the first lock further comprises a pawl movable relative to an outer surface of the cross-bar between an unlocked position where a surface of the pawl is withdrawn from the outer surface of the cross-bar and a locked position where the surface of the pawl is extended to engage the outer surface of the cross-bar.

19. The surgical table extension of claim 18, wherein the first lock further comprises an intermediary link having a first end engaged with the locking lever and a second end engaged with the pawl such that the intermediary link urges the pawl into the locked position when the locking lever is rotated in a first direction relative to the clamp body and the pawl is urged into the unlocked position when the locking lever is rotated in a second direction, opposite to the first direction.

20. The surgical table extension of claim 16, wherein the first lock further comprises a pawl movable relative to an outer surface of the cross-bar between an unlocked position where a surface of the pawl is withdrawn from the outer surface of the cross-bar and a locked position where the surface of the pawl is extended to engage the outer surface of the cross-bar.

21. A surgical table extension for use with a surgical table, the surgical table extension comprising:

a leg comprising a base;

first and second rails extending from the leg;

a hinge disposed on the leg, the hinge is configured to permit movement of the first and second rails about at least a first axis relative to the leg;

a cross-bar connecting respective ends of the first and second rails; and first and second clamps configured to clamp the frame members to the surgical table, the first and second clamps disposed at the respective ends of the cross-bar, each of the first and second clamps comprising:

an elongated recess for accepting a surgical table rail for fixing the first and second clamps to the surgical table, each elongated recess having a first open end for accepting the surgical table rail and an opposite bottom surface, the elongated recess extending from the open end to the opposite bottom surface.

22. The surgical table extension of claim 21, further comprising a movable protrusion movable into and out of each of the elongated recesses to lock and unlock, respectively, the first and second clamps to the surgical table.

23. The surgical table extension of claim 22, wherein the movable protrusion is arranged on a side wall of the elongated recess.

24. The surgical table extension of claim 22, wherein the movable protrusion is actuated by a lever operatively connected to the movable protrusion.

* * * * *